US010916055B2

(12) United States Patent
Sunshine-Hill

(10) Patent No.: US 10,916,055 B2
(45) Date of Patent: Feb. 9, 2021

(54) PLANE SWEEP FOR MULTI-LEVEL NAVIGATION MESHES

(71) Applicant: Microsoft Technology Licensing, LLC, Redmond, WA (US)

(72) Inventor: Benjamin T. Sunshine-Hill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/257,792

(22) Filed: Jan. 25, 2019

(65) Prior Publication Data

US 2020/0242836 A1 Jul. 30, 2020

(51) Int. Cl.
*G06T 19/00* (2011.01)
*G06T 17/20* (2006.01)
*G06T 17/10* (2006.01)

(52) U.S. Cl.
CPC ............ *G06T 17/205* (2013.01); *G06T 17/10* (2013.01); *G06T 19/003* (2013.01); *G06T 2210/21* (2013.01)

(58) Field of Classification Search
None
See application file for complete search history.

(56) References Cited

U.S. PATENT DOCUMENTS

2007/0118245 A1\* 5/2007 Goldman ............... D05B 19/08
700/138
2017/0337723 A1\* 11/2017 Sumner .................... G06T 1/20

FOREIGN PATENT DOCUMENTS

WO 0046755 A1 8/2000

OTHER PUBLICATIONS

Of Bartuschka et al. ("A Robust and Efficient Implementation of a Sweep Line Algorithm for the Straight Line Segment Intersection Problem"), ResearchGate, Sep. 1997 (Year: 1997).\*
(Continued)

*Primary Examiner* — Yanna Wu
(74) *Attorney, Agent, or Firm* — Schwegman Lundberg & Woessner, P.A.

(57) ABSTRACT

A computer implemented method includes obtaining a navigation mesh representing a multi-level structure. The navigation mesh has multiple polygons defined by vertices and segments extending between vertices. Some of the polygons overlap. A first status data structure is created in response to a sweep line first encountering a first vertex corresponding to a first contiguous interval of polygons, wherein the first data structure includes at least two segments having the vertex in common. A second status data structure is created in response to the sweep line encountering a second vertex having two different segments in common corresponding to a second contiguous interval of polygons. The method continues to sweep the mesh with the sweep line while keeping the first and second statuses isolated for each contiguous interval of polygons.

15 Claims, 24 Drawing Sheets

(56) References Cited

OTHER PUBLICATIONS

Kreveld, Marc Van., "Variations on Sweep Algorithms: Efficient Computation of Extended Viewsheds and Class Intervals", Retrieved From: http://www.bowdoin.edu/~ltoma/teaching/cs350/spring06/Lecture-Handouts/gis-viewshedsKreveld.pdf, Retrieved on: Apr. 3, 2020, 14 Pages.

Nievergelt, et al., "Plane-Sweep Algorithms for Intersecting Geometric Figures", In Journal Communications of the ACM, vol. 25, Issue 10, Oct. 1982, pp. 739-747.

"International Search Report & Written Opinion Issued in PCT Application No. PCT/US2019/068462", dated Apr. 15, 2020, 13 Pages.

* cited by examiner

PLANE SWEEP FOR MULTI-LEVEL NAVIGATION MESHES

BACKGROUND

A "navigation mesh" is a decomposition of the navigable area of a video game level or other graphical representations into contiguous polygons. Navigation meshes are widely used to help characters move around the level. There is a class of computational geometry algorithms, known as "plane sweep" or "sweep-line" algorithms, which can be used to query and modify 2-dimensional geometric arrangements such as navigation meshes. Finding Voronoi diagrams, polygon clipping, and snap rounding are all problems which are solved by plane sweep algorithms.

Unfortunately, these plane sweep algorithms do not work properly with navigation meshes with overlapping areas (such as would occur in a multi-story building). Because these algorithms depend on maintaining an absolute order of intersection of contours with the sweep-line, disconnected areas of geometry (those on different floors) interfere with each other, raising spurious intersection events, and treating areas as overlapping when they should be vertically distinct.

A frequent solution to this problem is to split the navigation mesh into non-overlapping pieces and nm the algorithm separately on each piece (e.g. one piece for each floor, and one piece for each flight of stairs connecting the floors), then combine the results. However, this can cause problematic artifacts near the seams between pieces.

SUMMARY

A computer implemented method includes obtaining a navigation mesh representing a multi-level structure. The navigation mesh has multiple polygons defined by vertices and segments extending between vertices. Some of the polygons overlap. A first status data structure is created in response to a sweep line first encountering a first vertex corresponding to a first contiguous interval of polygons, wherein the first data structure includes at least two segments having the vertex in common. A second status data structure is created in response to the sweep line encountering a second vertex having two different segments in common corresponding to a second contiguous interval of polygons. The method continues to sweep the mesh with the sweep line while keeping the first and second statuses isolated for each contiguous interval of polygons. An arbitrary number of status structures, one corresponding to each separate region of geometry along the sweep line may be maintained for complex structures having multiple levels.

BRIEF DESCRIPTION OF THE DRAWINGS

FIGS. 2A, 2B, 2C, 2D, 2E, 2F, 2G, 2H, 2I, 2J, 2K, 2l, 2M, 2N, 2O, 2P, 2Q, 2R 2S, 2T, and 2U are visual representations of a navigation mesh illustrating selected positions of a sweep line being swept across the navigation mesh according to an example embodiment.

DETAILED DESCRIPTION

Figure 1:
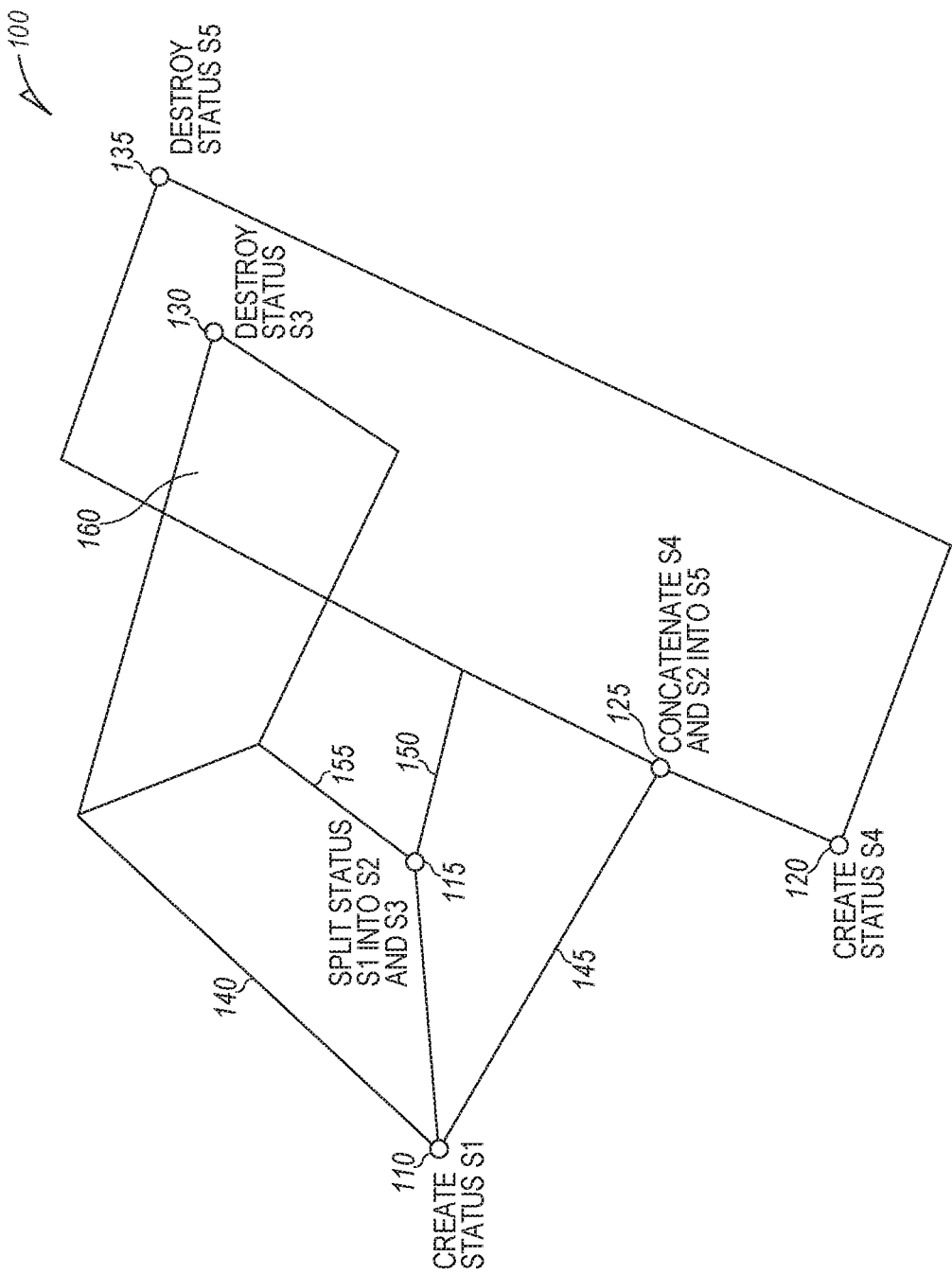
FIG. 1 is a visual representation of a navigation mesh illustrating boundary contours of a simple multi-level shape according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A navigation mesh, or navmesh, is an abstract data structure used in artificial intelligence applications to aid agents in pathfinding through complicated spaces. Navmeshes are one example of an abstract data structure that have been used to digitally represent a navigable area of a video game level into contiguous polygons. Navigation meshes are widely used to help characters move around the level. Such meshes have been used for many years in robotics, where it has been called a meadow map.

The idea behind plane sweep algorithms is to imagine that a line (often a vertical or horizontal line) is swept or moved across a plane, stopping at some points in a navigation mesh. Geometric operations are restricted to geometric objects that either intersect or are in the immediate vicinity of the sweep line whenever it stops, and the complete solution is available once the line has passed over all objects.

In various aspects of the present inventive subject matter, a plane sweep algorithm is modified by allowing the algorithm to have multiple sweep-line statuses, one for each contiguous interval of a navigation mesh. Different statuses are created, destroyed, split, and concatenated while a sweep line follows the contours of the navigation mesh. The use of these different statuses provides for simultaneous processing of overlapping regions of the navigation mesh while preventing geometric operations on the regions from interfering with each other. The processing may also be more efficient, as regions do not need to be broken up, swept individually, and recombined.

If one were to view the status structures, which are not directly visible to a user during progression of the sweep line across a structure, one would see status structures being created when the sweep line reached one side of a multistory building, and destroyed when the sweep line reached the other side. If they were watching the sweep line sweep over a staircase, they would see the staircase splitting off from the lower floor as a separate interval with its own status structure, then later combining with the interval representing the upper floor.

FIG. 1 is a visual representation of a navigation mesh 100 illustrating boundary contours (also referred to as boundary segments) of a simple multi-level shape. The mesh 100 is used to illustrate different operations on the multiple separate statuses that are created, destroyed, split, and concatenated. Further details regarding these operations and the effect of the operations on status data structures are shown in further figures.

Mesh 100 contains several vertices of interest where status operations are performed as indicated at 110, 115, 120, 125, 130, and 135 progressing from left to right and using a vertical sweep line, not shown. In addition, boundary contours and interior contours are shown as represented by straight lines. Boundary contours bound the interior of the navigation mesh, defining the extents of contiguous regions of the interior. Contiguous regions are entirely consisting of the interior of the boundary contours with no breaks in the middle of the region. Interior contours span between boundary contours and allow the plane sweep algorithm to determine which contours should be processed in the same sweep-line status (as well as simply participating in the plane sweep). The contours represent the navigation mesh which is decomposed into convex polygons, or even just monotone polygons, with natural boundary and interior contours.

The set of sweep-line statuses is managed based on these contours. In short, a separate status is maintained for each interval of the sweep-line which is bounded by two mutually visible boundary contour points. As a new pair of boundary contours is encountered by the sweep-line, either a new status data structure is created, or an existing status data structure is split into two status data structures, depending on whether the boundary contours are inward- or outward-pointing. Similarly, as the sweep-line leaves a pair of boundary contours behind, the two sweep-line statuses which the boundary contours bound are either concatenated, or a sweep-line status is destroyed if both contours bound it.

As the sweep line encounters vertex 110, a status, S1, is created comprising boundary contours 140 and 145. At vertex 115, status S1 is split into statuses S2 and S3, as new diverging boundary contours 150 and 155 are encountered. A new vertex 120 is next encountered as the sweep continues. At this point, S4 and S2 are combined into a new status, S5. The status of S3 remains the same.

As the sweep continues, vertex 130 is encountered. Note the overlapping region 160 of the mesh 100. The overlapping portion has a corresponding status, S3, that is now destroyed, as the boundary contours meet and come to an end. However, the status, S5, continues, as it was separate and independent of S3. As the sweep continues further toward the right of mesh 100, vertex 135 is encountered, where the boundary contours of S5 meet, resulting in the destruction of S5.

With contiguous contours localized to separate statuses, intersection events may be limited to those involving contours on the same status. An "intersection" occurs wherever two or more segments meet at the same point, including those where they start/end at a given point rather than crossing over each other. The figures only show intersections at segment starts/ends.

Although an event queue may be shared (and processed) between statuses, each status receives independent events as long as they remain distinct. The events are applied independently to each different status. The result is that even as multiple overlapping regions, like region 160, of the navigation mesh are processed simultaneously, the isolation of their sweep-line statuses prevents them from interfering with each other. "Simultaneously" here means that the events relating to multiple status structures are processed in the order in which those events occur, rather than processing all the events for a first status structure and then all the events for a second status structure. That is, the status structure separation does not change the order in which events are processed over all.

Figure 2A:
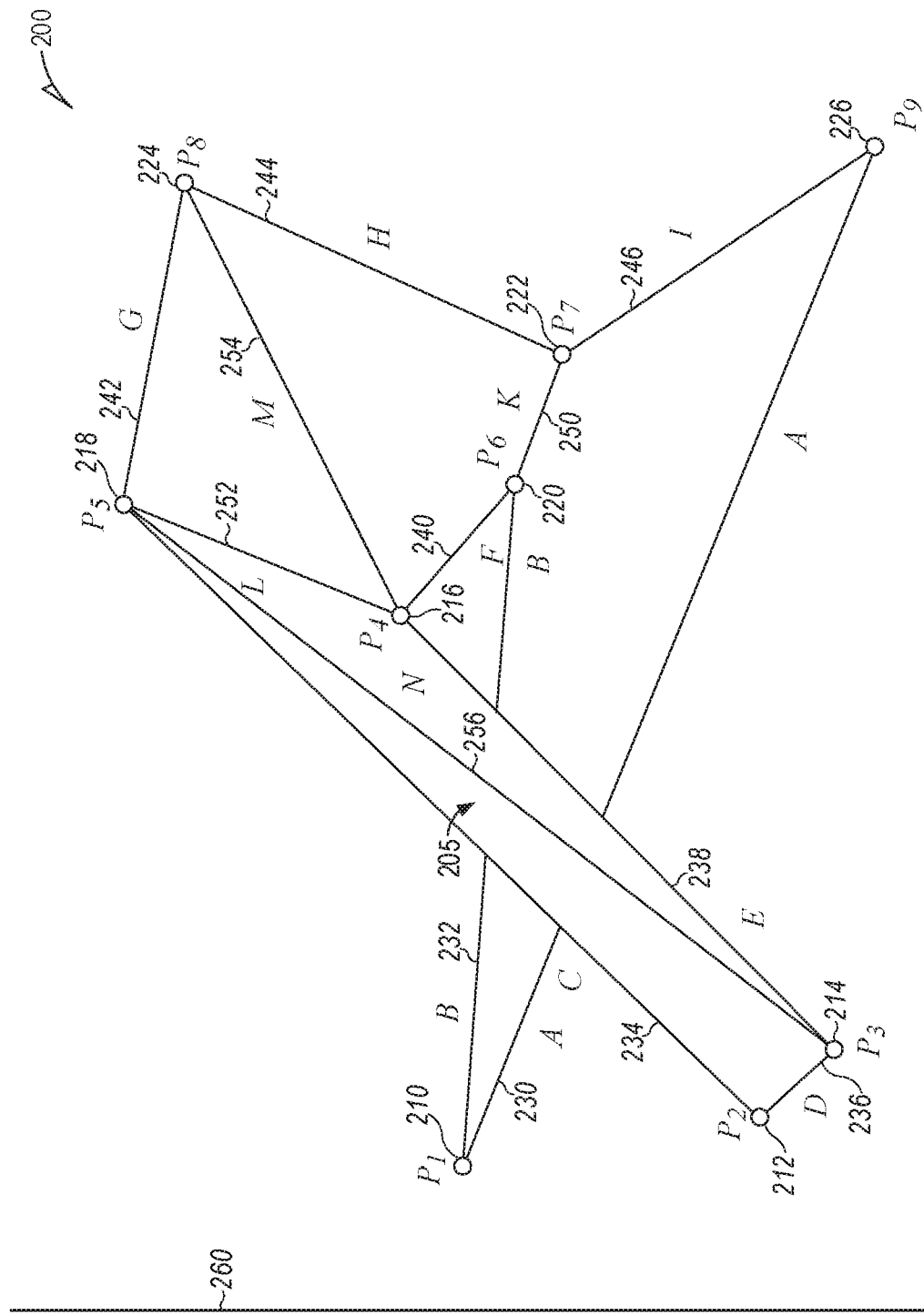

FIG. 2A illustrates a different mesh 200 that includes an overlapping portion indicated generally at 205. Vertices of the mesh 200 include P1 210, P2 212, P3 214, P4 216, P5 218, P6 220, P7 222, P8 224, and P9 226. Boundary segments are indicated at A230, B 232, C 234, D 236, E 238, F 240, G 242, H244, and I 246. Interior segments are indicated at K 250, L 252, M 254, and N 256. An initial position of a sweep line 260 is shown to the left of the mesh 200 and is vertically oriented. A sweep algorithm has no state at this time. Various positions of the sweep line will be shown in FIGS. 2A-U as it sweeps across the mesh 200 and encounters various vertices. Events will be queued as the sweep line reaches the various vertices.

An "event" is a point in the sweep line's motion at which the algorithm needs to do something; that is, a segment start/end, or an intersection between multiple segments. Processing an event (when the sweep line reaches it) may entail the queueing of other events. For instance, when the sweep line encounters the start point of a segment, it enqueues the event of that segment ending. The ending event wasn't previously a queued event because a segment can't end before it starts.

Figure 2B:
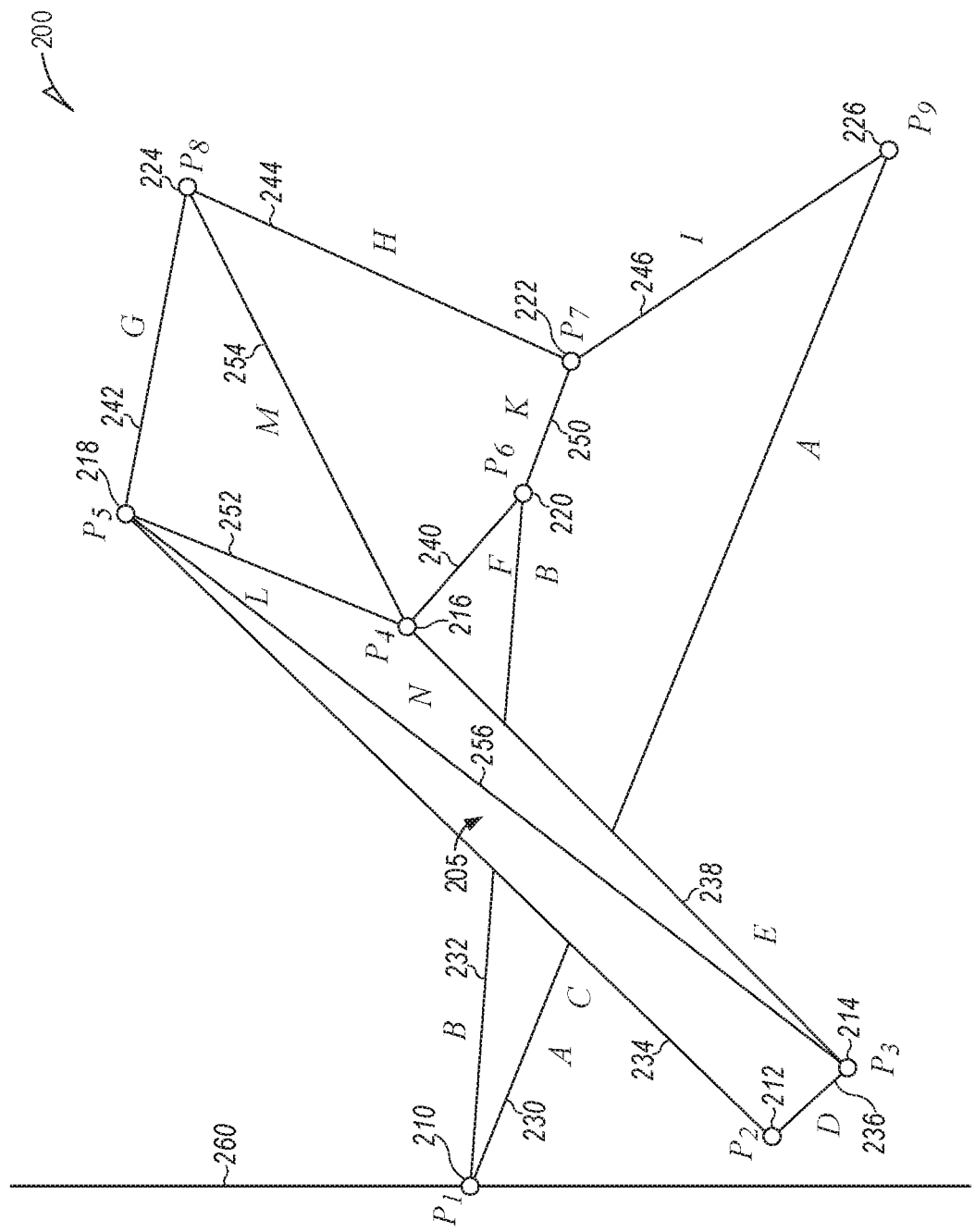

In FIG. 2B, the sweep line 260 reaches vertex P1. At this point, segments A and B begin, defining a region of geometry which will extend to the right. This forms a new status structure.

Figure 2C:
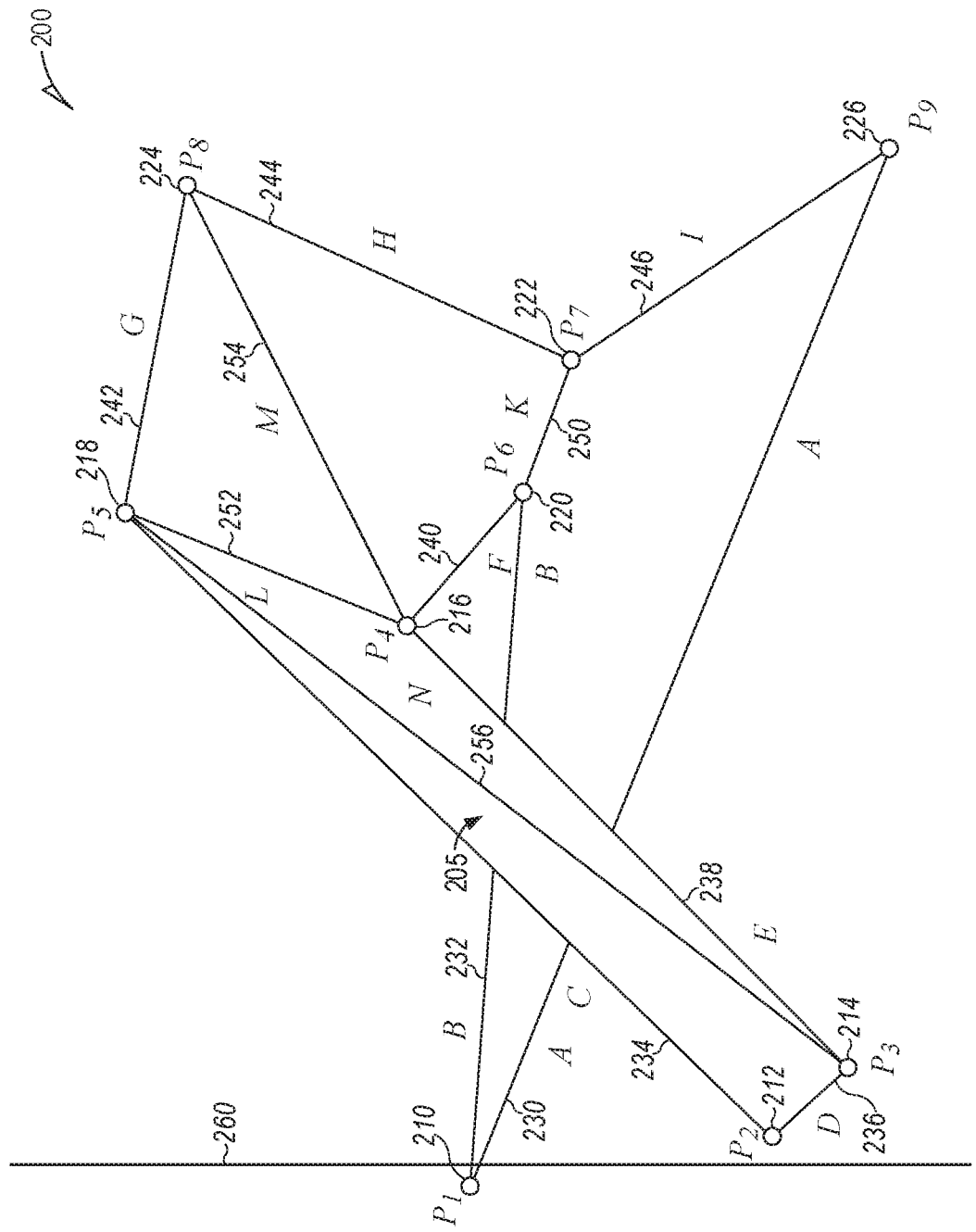

In FIG. 2C with the sweep line 260 just past vertex P1, having processed the event at vertex P1, there is one status structure created, with the value (AB), describing the contiguous region of geometry along the sweep line between segments A and B. The next event to process is at P2.

Figure 2D:
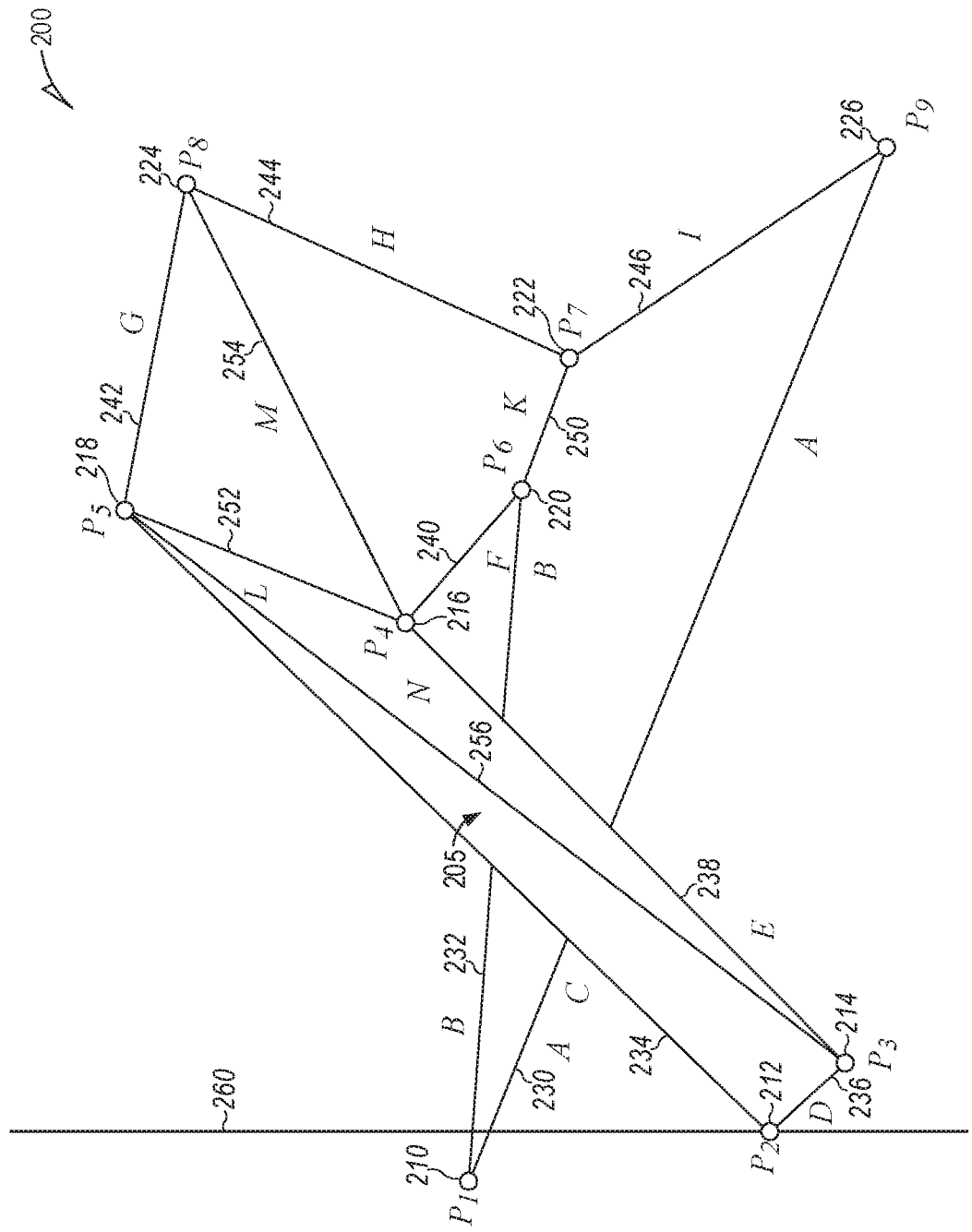

In FIG. 2D, with the sweep line 260 at vertex P2, segments D and C begin. Because these are not directly connected to A or B but define their own contiguous region, they will form their own new status structure, rather than affecting the first status structure.

Figure 2E:
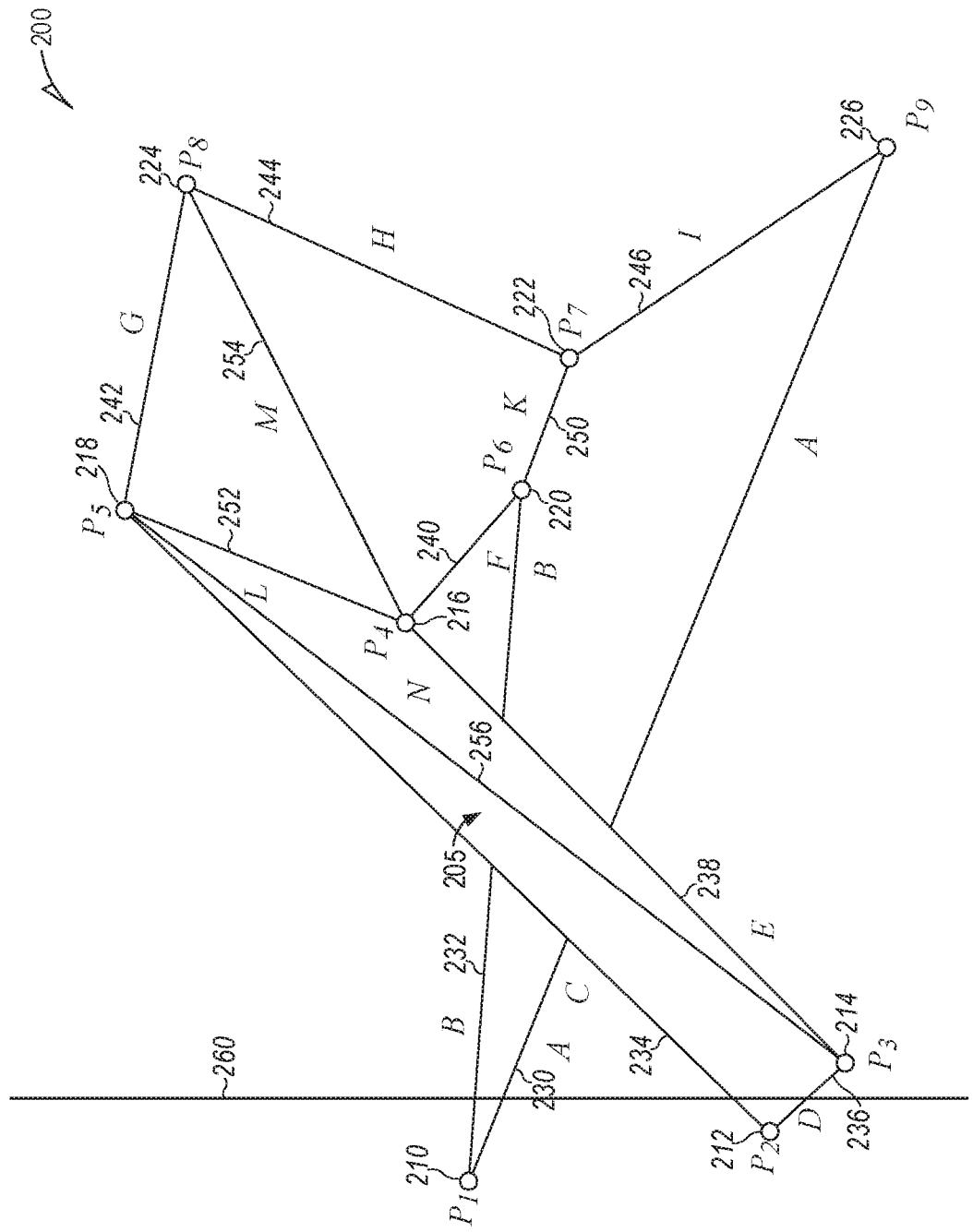

In FIG. 2E, with the sweep line 260 just past vertex P2, having processed the event at P2, there are two status structures, with the values (AB) and newly created (DC). The next event to process is at vertex P3.

Figure 2F:
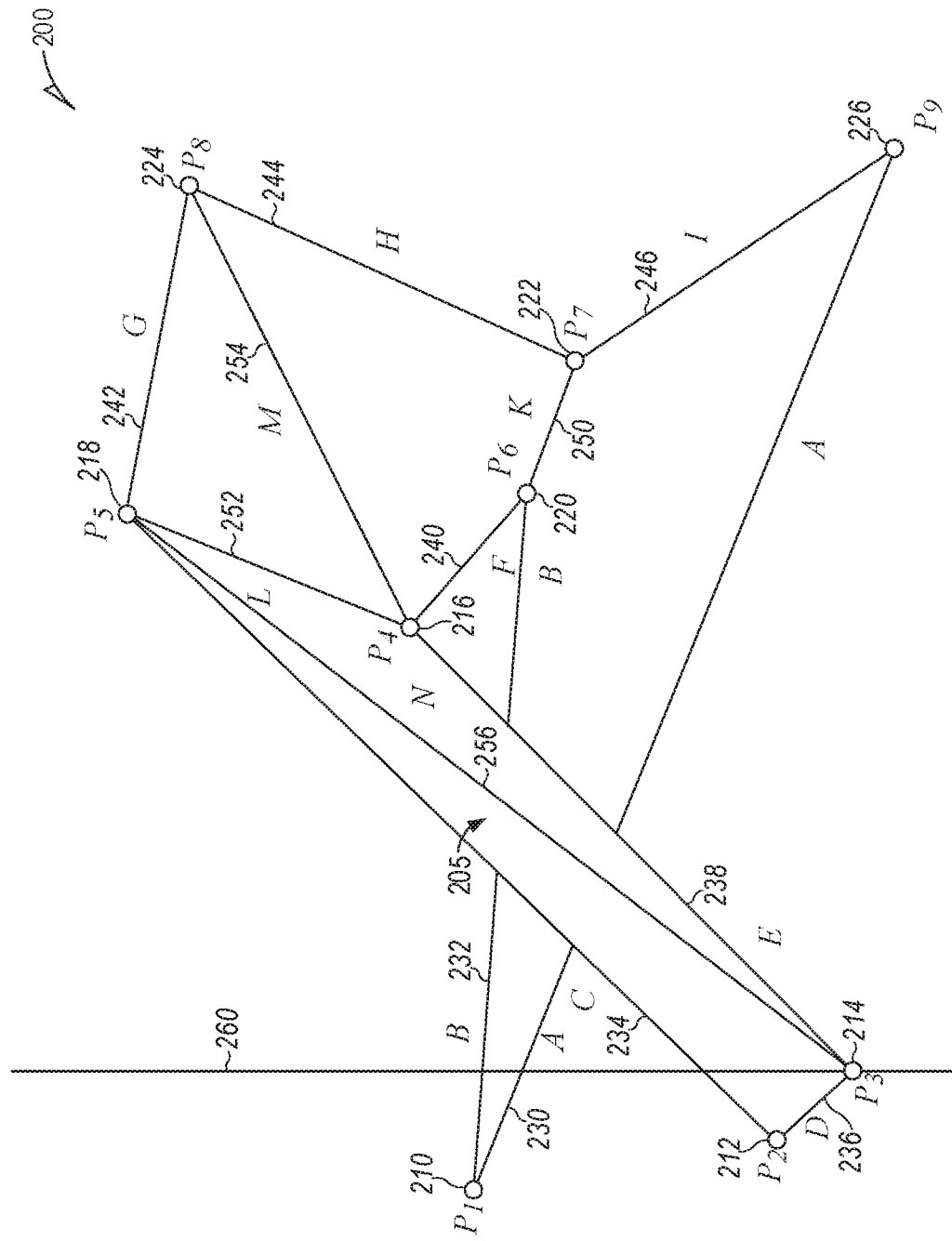

In FIG. 2F, with the sweep line 260 at vertex P3, segment D ends and segments E and N begin. These are relevant to the second status structure, because it contains D, but not relevant to the first status structure, which will be unchanged by the event.

Figure 2G:
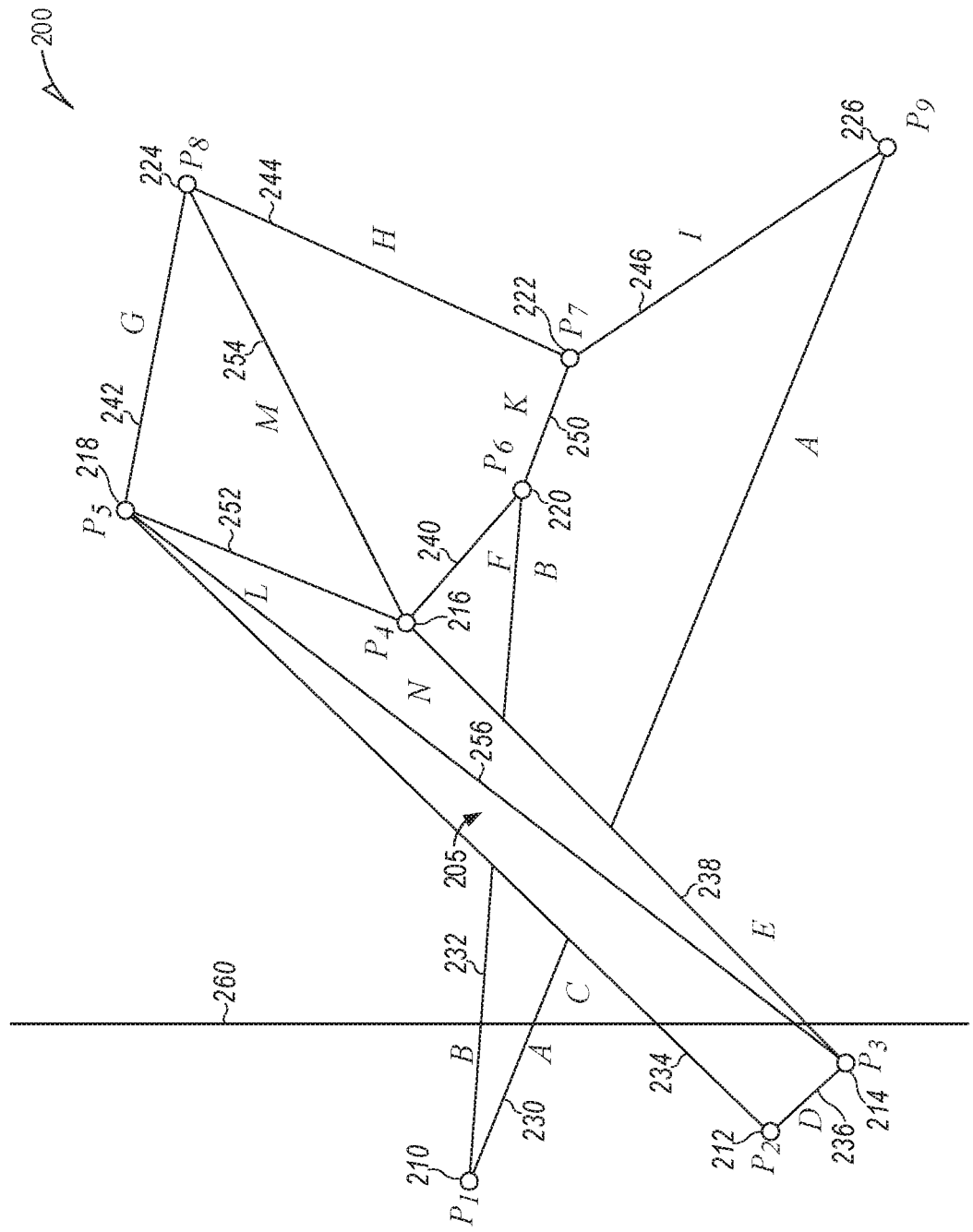
Figure 2H:
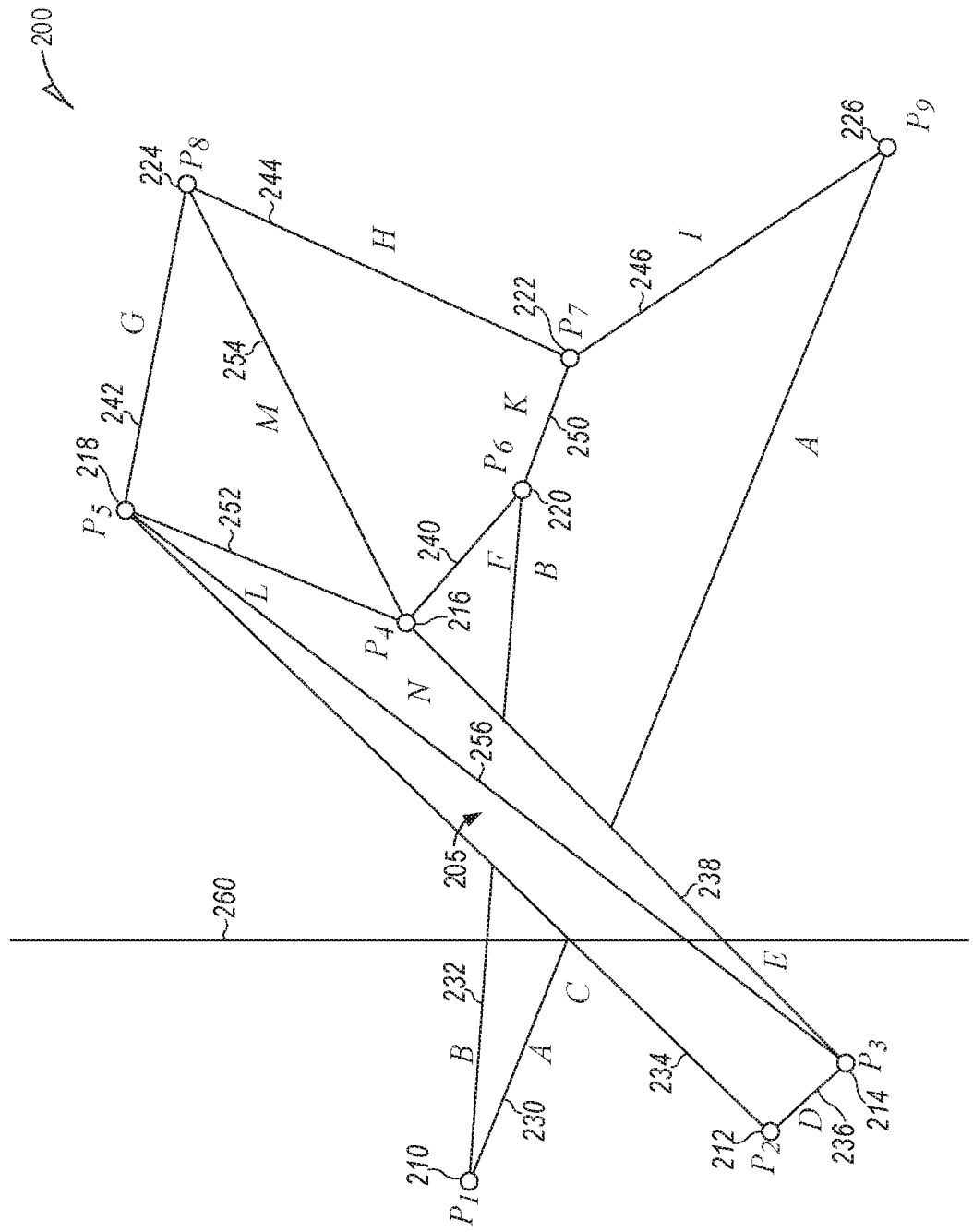

In FIG. 2G with the sweep line 260 just past vertex P3, the two status structures now have the values (AB) and (ENC), indicating that the sweep line 260 intersects a contiguous area of geometry between A and B, as well as another contiguous area of geometry between E and C (which includes internal segment N in the middle). Note that the ordering of the two status structures is not important to or maintained by the algorithm: only the ordering within a single status structure is relevant.

Figure 2I:
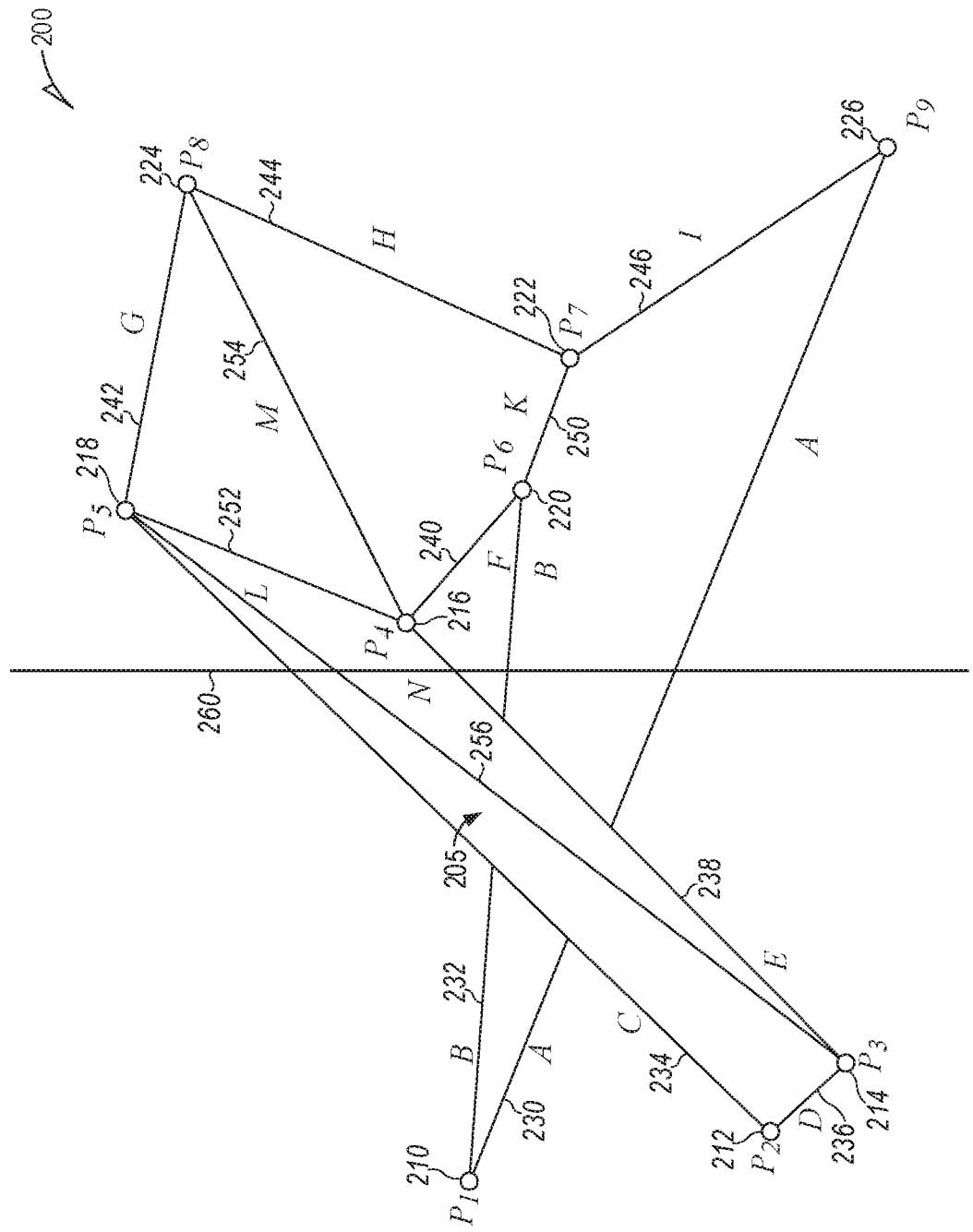

In FIG. 2I, the next event to process is with the sweep line 260 at vertex P4. Even though segments A and B cross over E, N, and C, those intersections are ignored by the algorithm because they would not affect the membership or ordering of either status structure.

In FIG. 2I, after the sweep line 260 crosses the spurious intersections, the two status structures still have the values (AB) and (ENC).

Figure 2J:
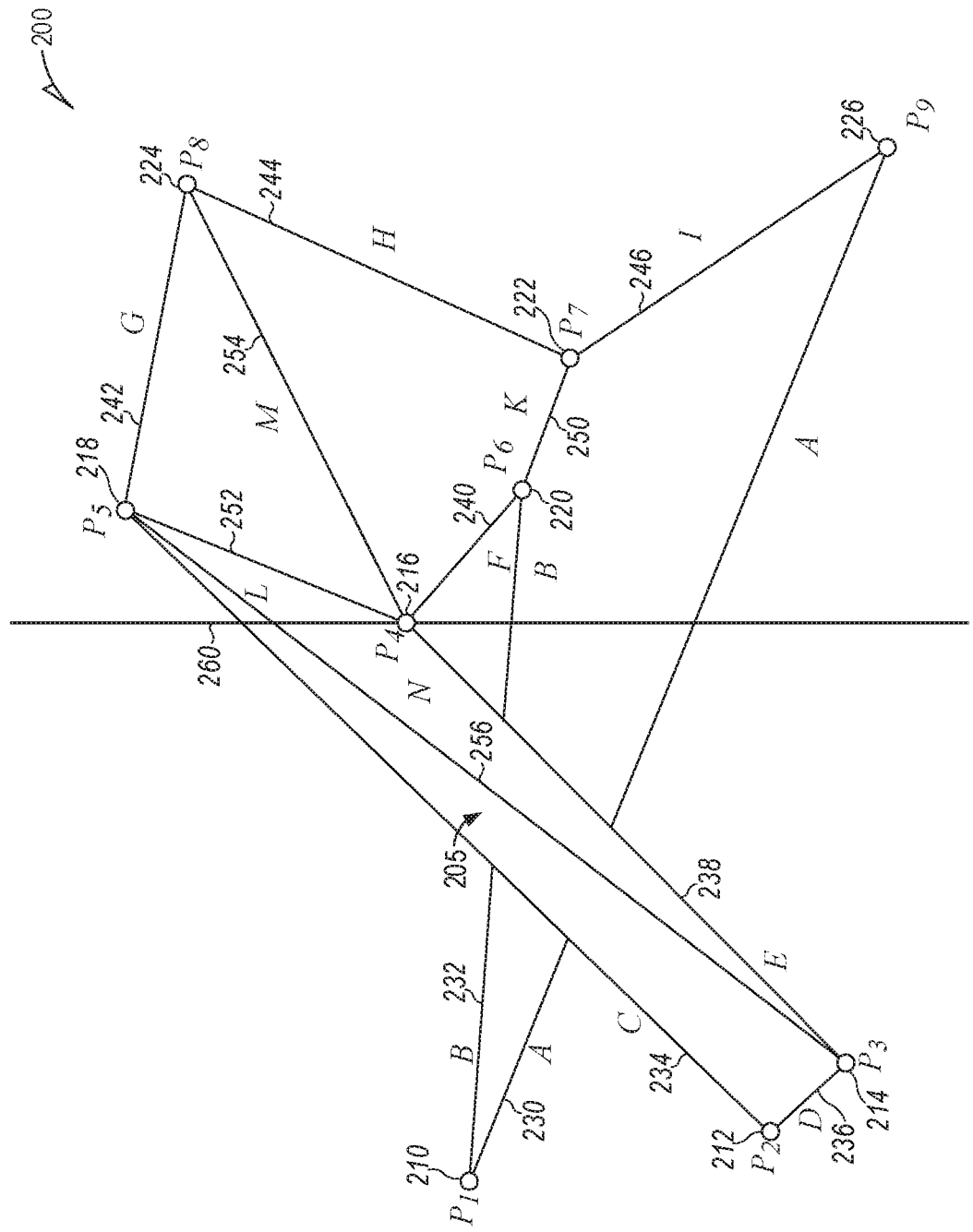

In FIG. 2J, with the sweep line 260 at vertex P4, segment E ends and segments L, M, and F begin. These are relevant to the first status structure because it contains E.

Figure 2K:
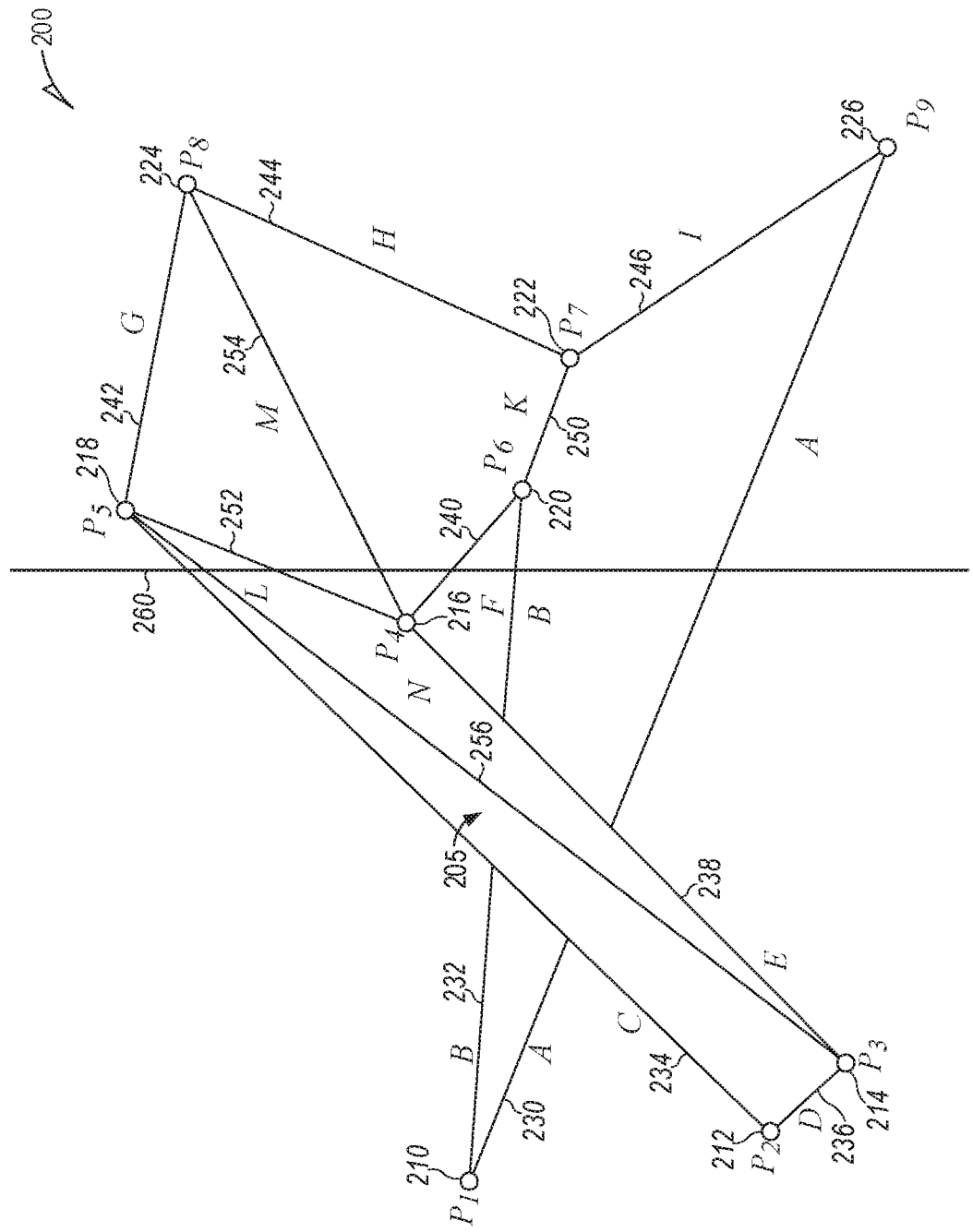
Figure 2L:
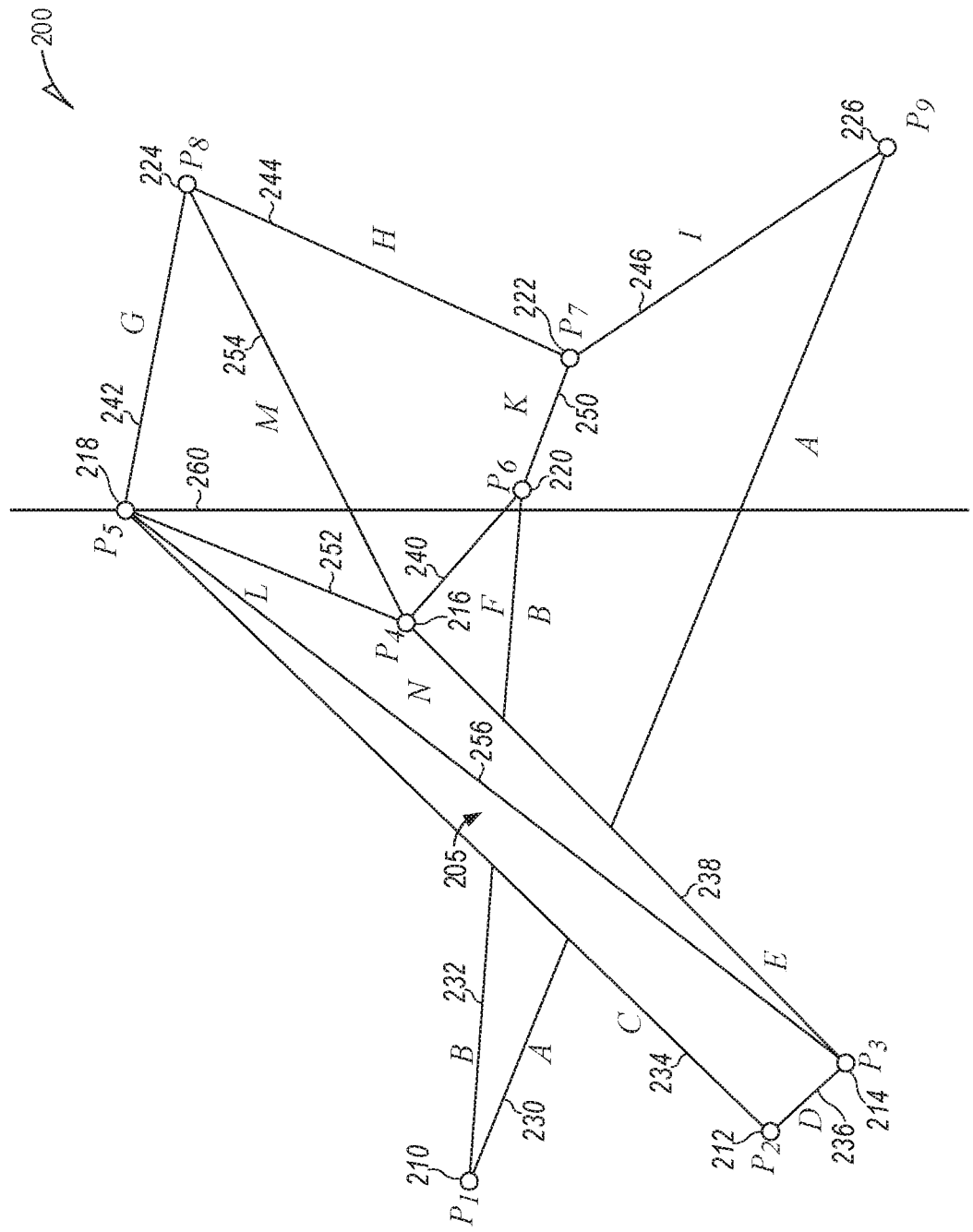

In FIG. 2K, after the sweep line 260 has past vertex P4, the two status structures now have the values (AB) and (FMLNC). The next event to process is at vertex P5.

In FIG. 2I, with the sweep line 260 at vertex P5, segments L, N, and C end, and segment G begins. This is relevant to the second status structure, which contains the ending segments.

Figure 2M:
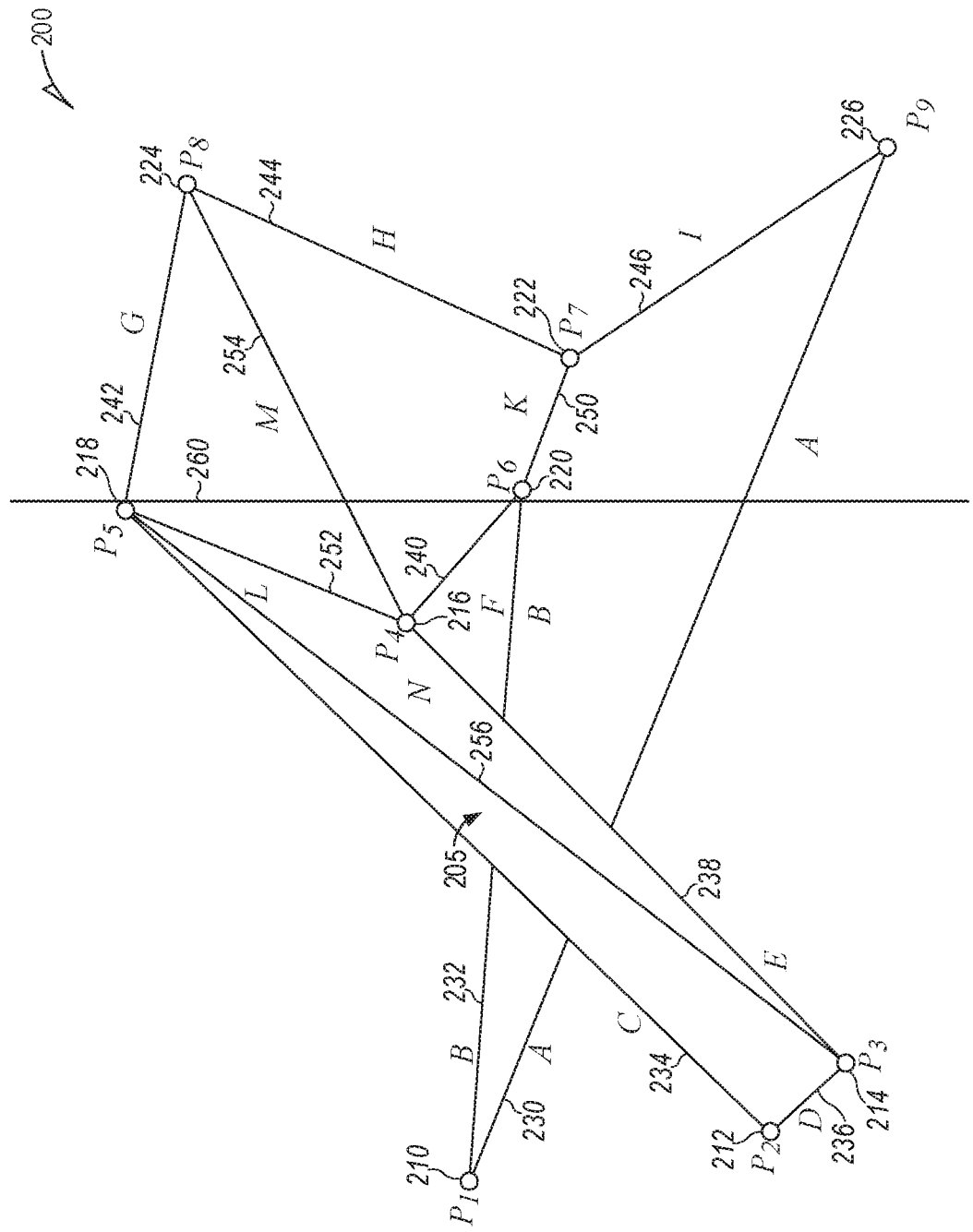

In FIG. 2M, with the sweep line 260 just past vertex P5, the status structures now have the values (AB) and (FMG). The next event to process is at vertex P6.

Figure 2N:
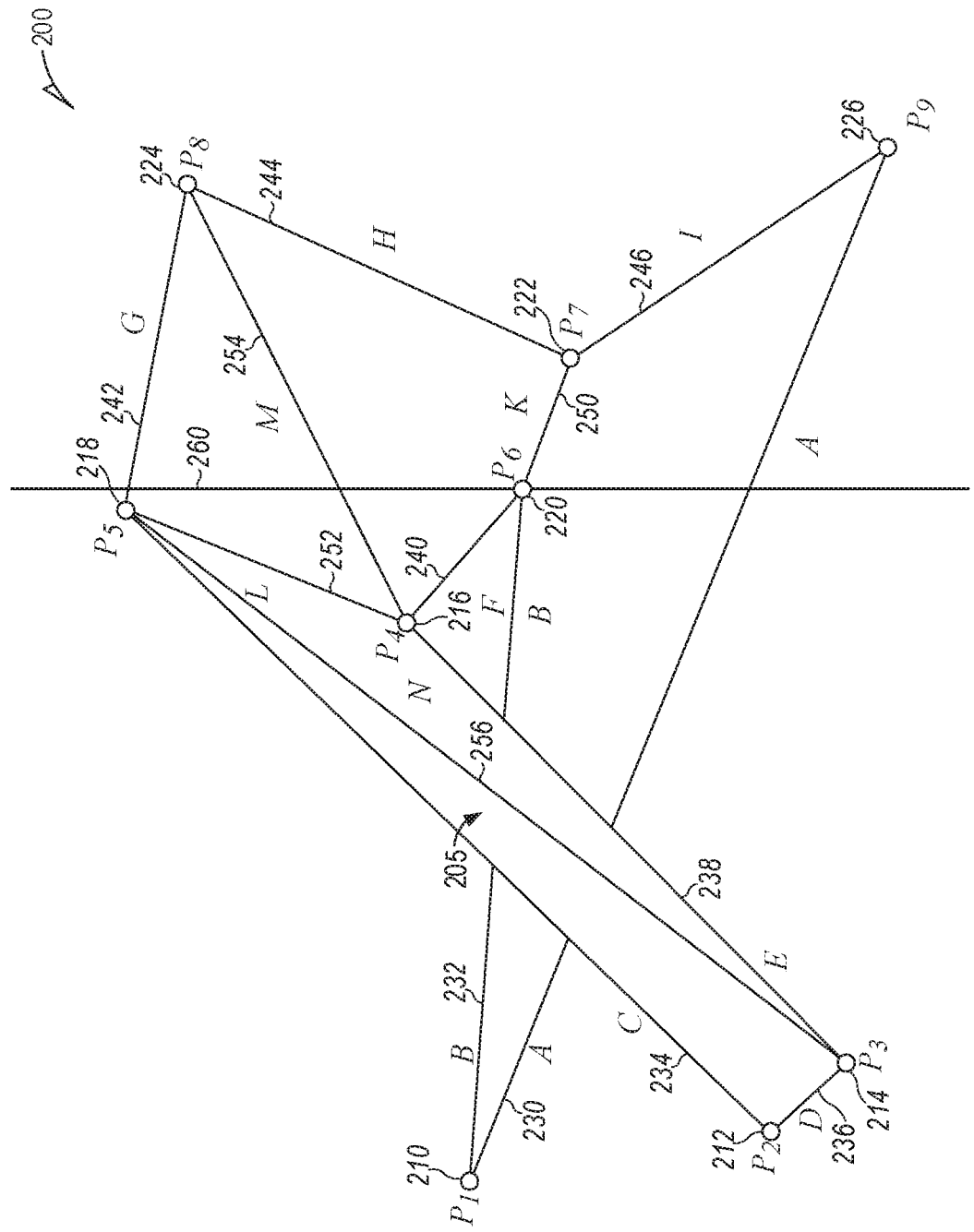
Figure 20:
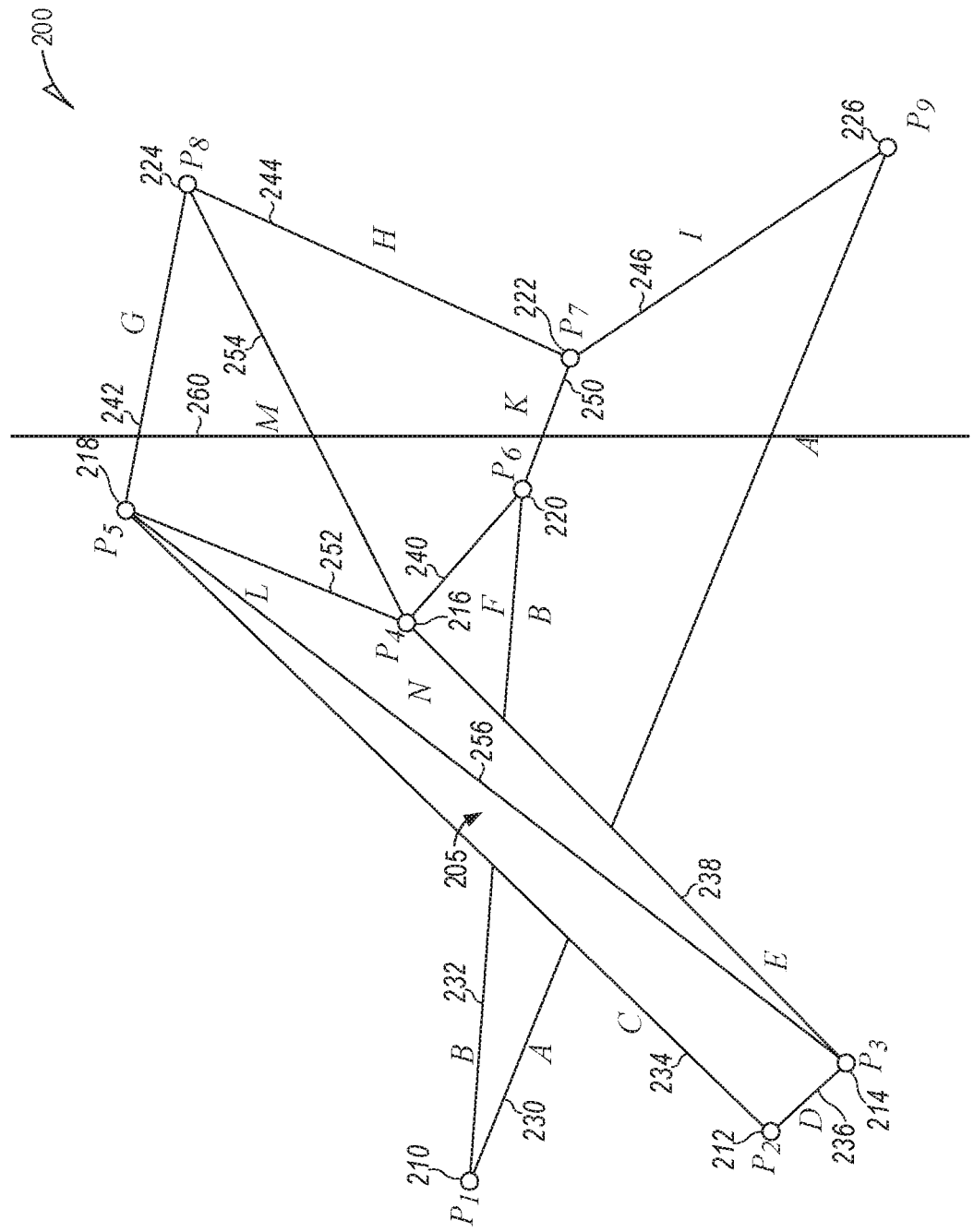

In FIG. 2N, with the sweep line 260 at vertex P6, segments B and F end and K begins. F and B are contiguous boundary segments (that is, they share a corner), and their ending cause the two disconnected regions to join following P6. This indicates that the two status structures need to merge during this event.

In FIG. 2O, with the sweep line 260 just past vertex P6, there is now only one status structure, with the value (AKMG). The next event to process is at vertex P7.

Figure 2P:
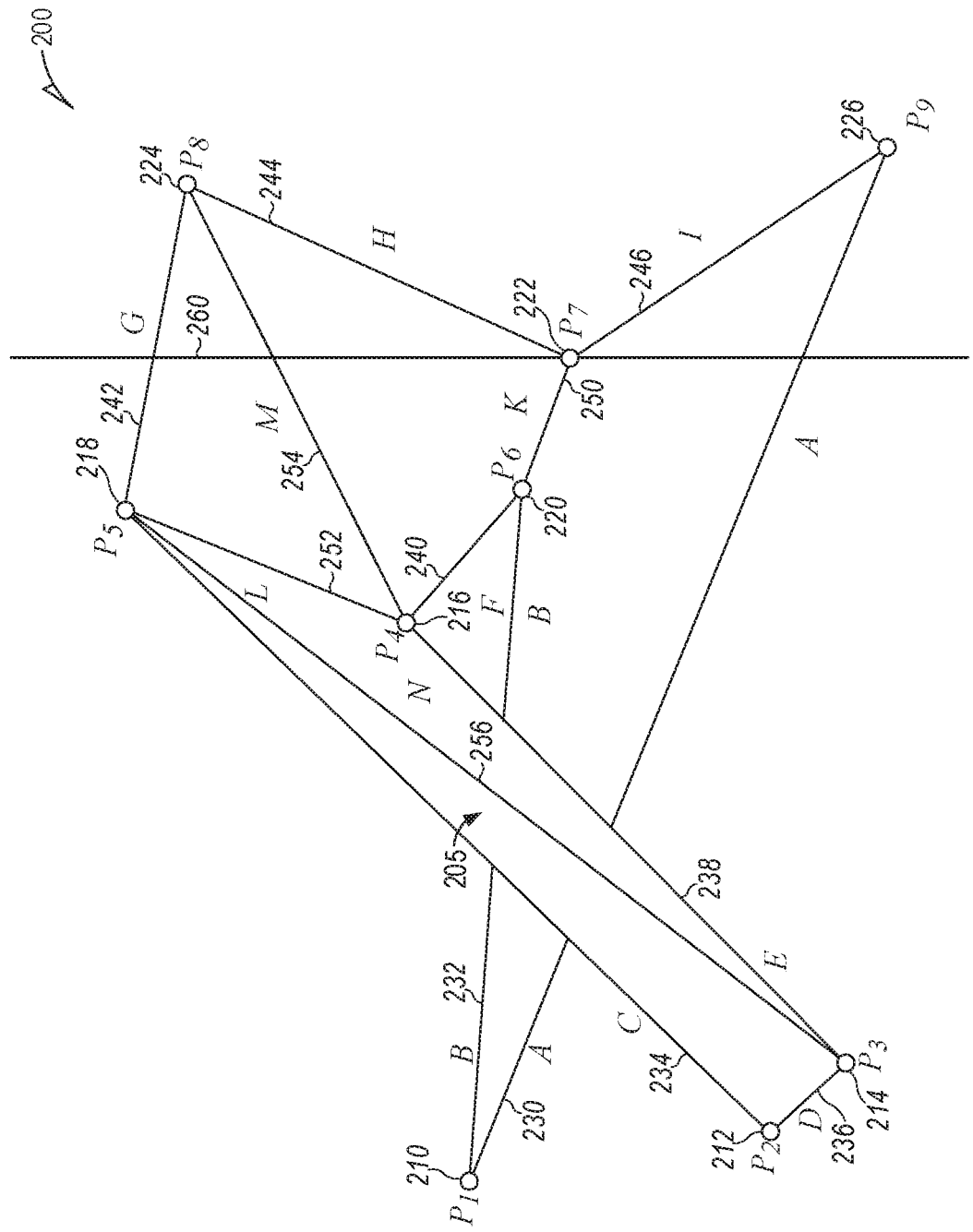

In FIG. 2P, with the sweep line 260 at vertex P7, segment K ends, and H and I begin. Because H and I are boundary segments which will divide the sweep line after this point, this event will result in the status structure splitting in two.

Figure 2Q:
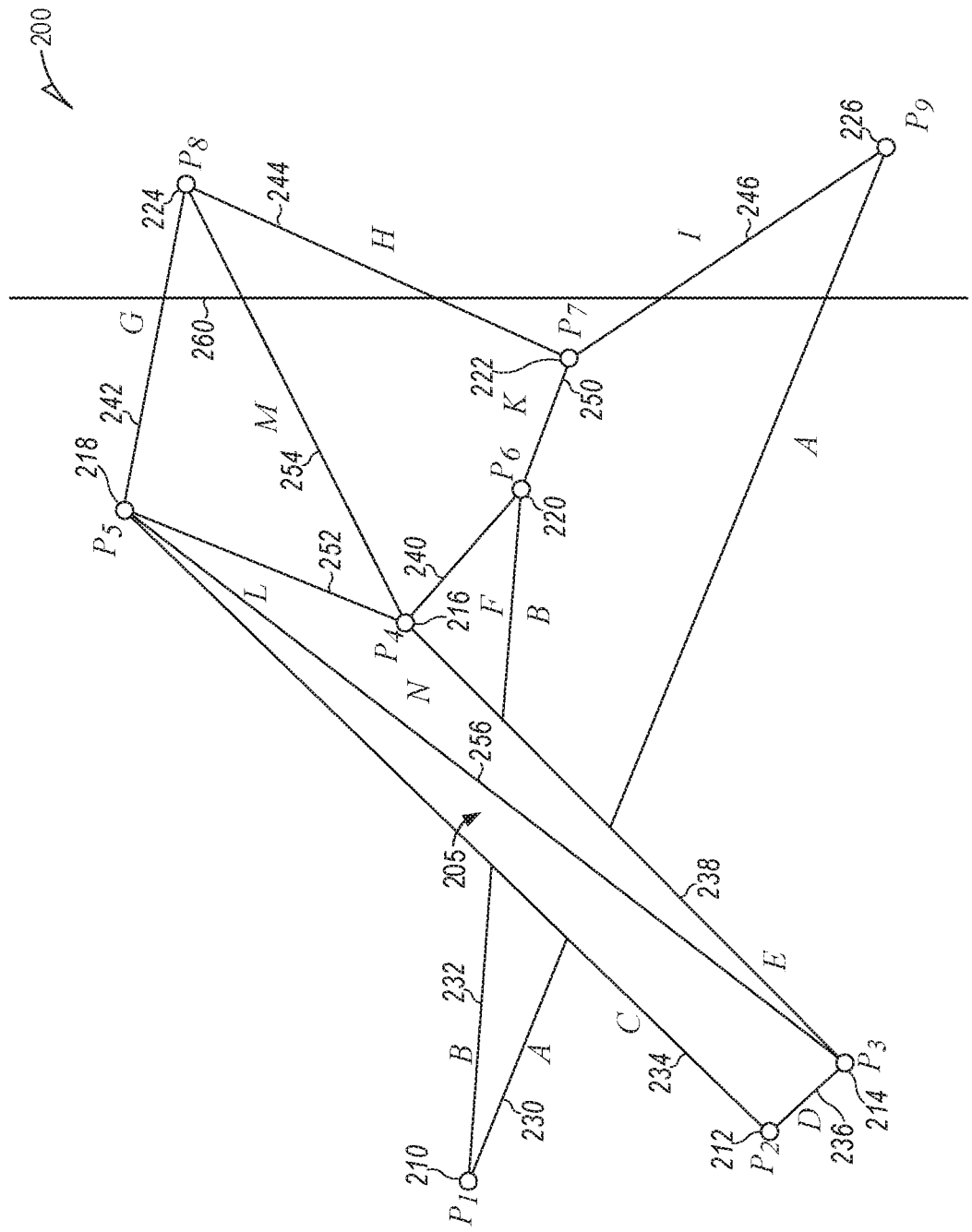

In FIG. 2Q, with the sweep line 260 just past vertex P7, there are now two status structures, with the values (A) and (HMG). The next event to process is at vertex P8.

Figure 2R:
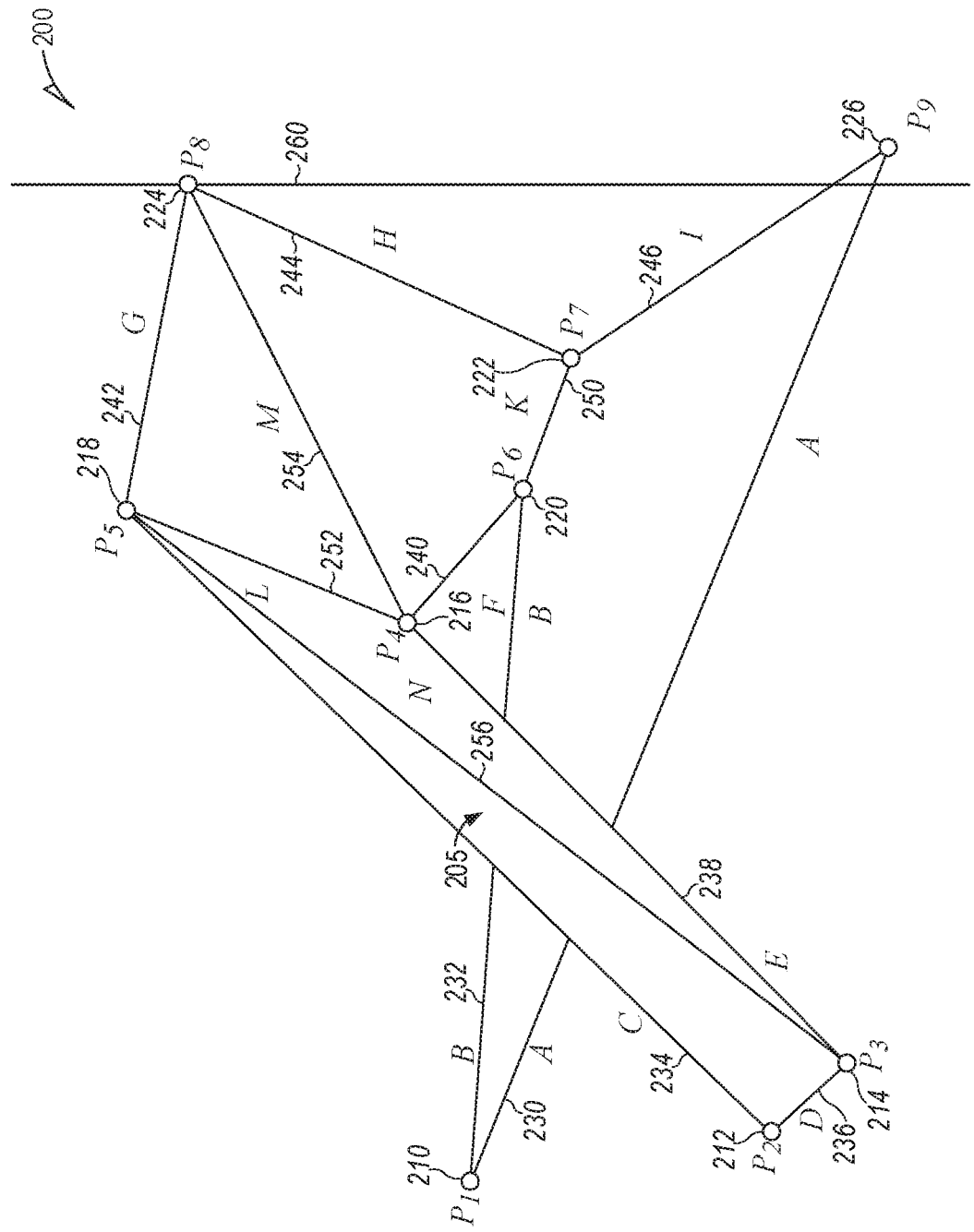

In FIG. 2R, with the sweep line 260 at vertex P8, the segments H, M, and G end, completely clearing and destroying one of the status structures.

Figure 2S:
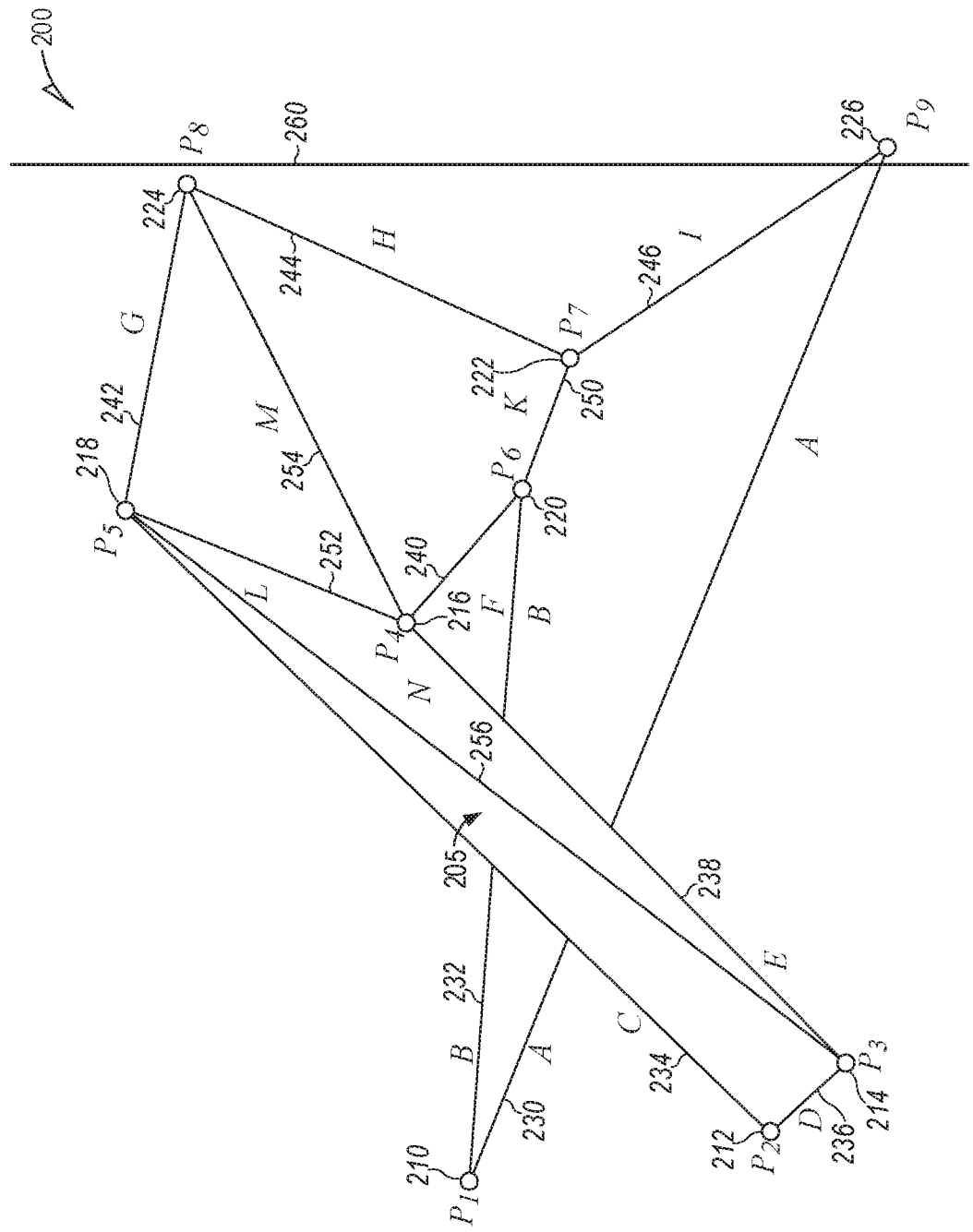

In FIG. 2S, with the sweep line 260 just past vertex P8, there is now only one status structure, with the value (AI).The next event to process is at vertex P9.

Figure 2T:
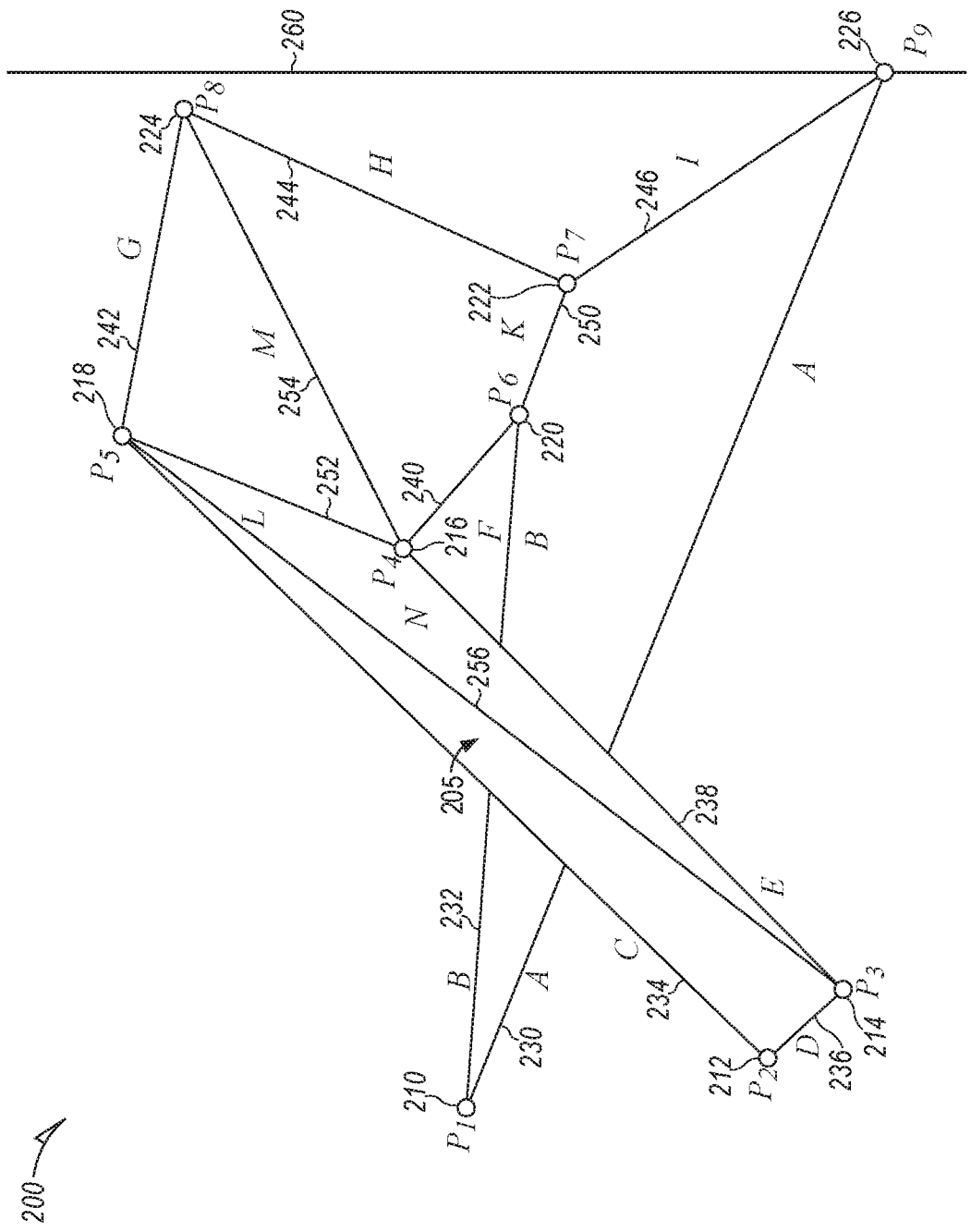

In FIG. 2T, with the sweep line 260 at vertex P9, segments A and I end, destroying the remaining status structure.

Figure 2U:
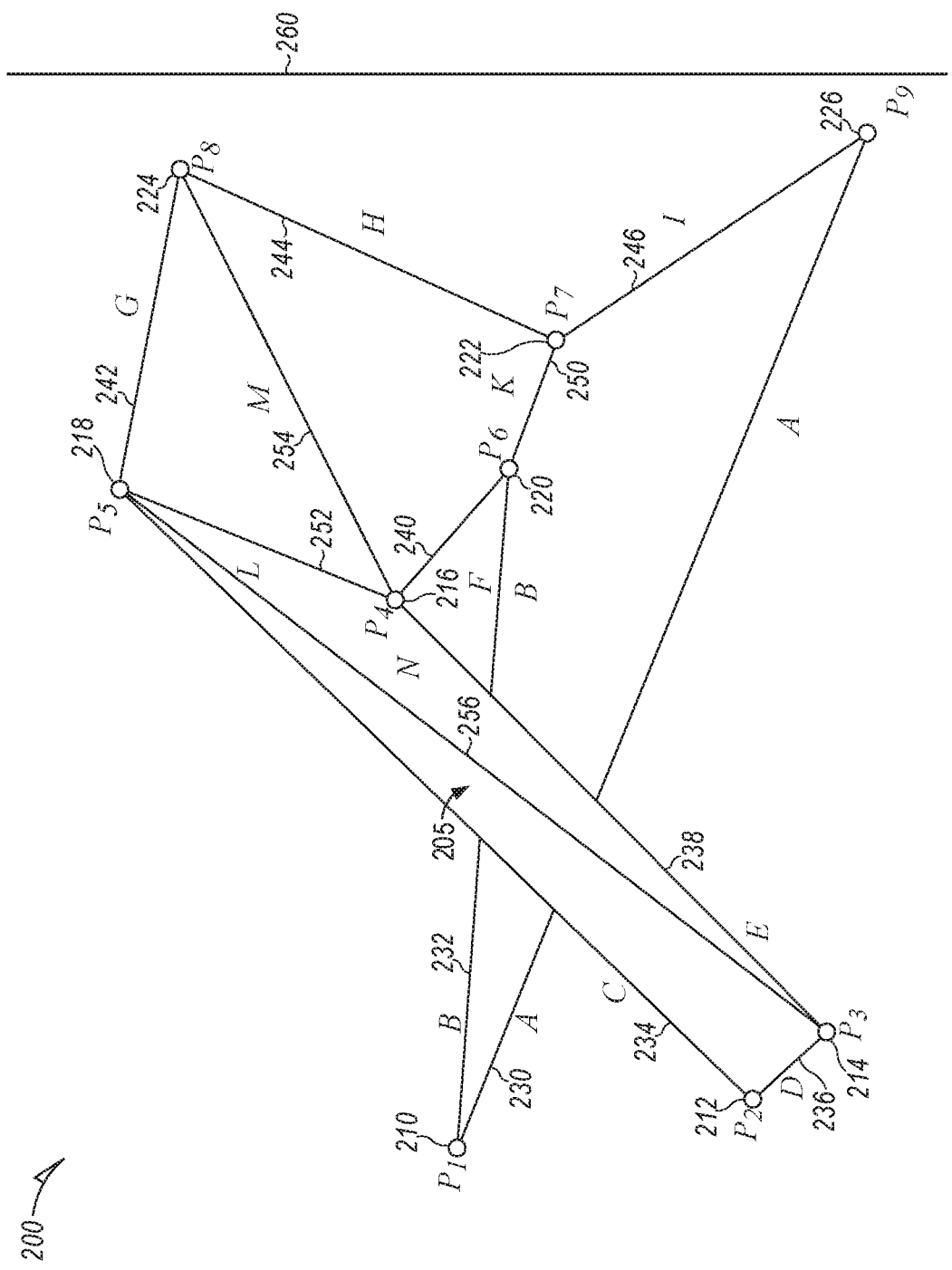

In FIG. 2U, the sweep line 260 has passed all the geometry, and the algorithm is complete.

The contours to be processed in the same sweep line status are determined as follows: When the sweep line encounters the beginning of one or more boundary contours defining the right extent of the interior (as in P7 222, where H 244 and I 246 begin), the algorithm needs to find out which existing status structure those should be associated with. In the example shown, K 250 also intersects at P7 222, so the algorithm knows to process H 244 and I 246 in the context of the status structure which holds K 250.

Figure 3:
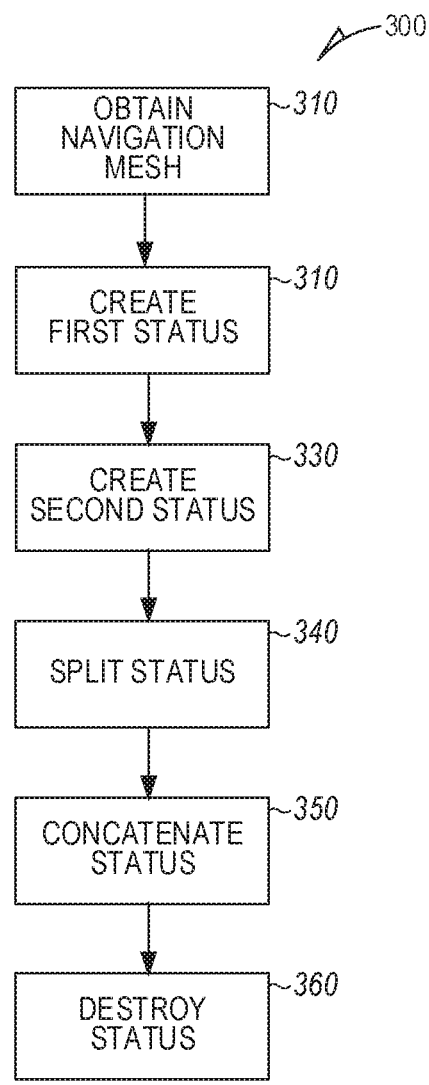
FIG. 3 is a flowchart illustrating a method of performing a sweep operation on a multi-level mesh composed of multiple regions according to an example embodiment.

FIG. 3 is a flowchart illustrating a computer implemented method 300 of performing a sweep operation on a multi-level mesh composed of multiple regions. States are kept separate while sweeping across an input structure until sweep events occur. The method combines and splits states as needed to keep different regions from spuriously interacting with each other.

Method 300 begins by obtaining, at operation 310, a navigation mesh representing a multi-level structure. The navigation mesh may be representative of a building or other structure having multiple levels, such as in a video game. The navigation mesh has multiple polygons defined by vertices and segments extending between vertices. Some of the polygons overlap. At operation 320, a first status data structure is created in response to a sweep line first encountering a vertex. The first data structure includes at least two segments having the vertex in common.

A second status data structure is created at operation 330 in response to the sweep line encountering a vertex having two different segments in common. The sweep line continues to sweep the mesh while keeping the first and second status data structures isolated for each contiguous interval of polygons. At operation 340, one of the first or second status data structures is split in response to a contiguous interval of polygons diverging at an encountered vertex. At operation 350, two status data structures are concatenated in response to their respective contiguous intervals of polygons intersecting at a vertex.

As the sweep line continues, a status data structure of an interval of polygons is destroyed at operation 360 in response to all segments in the interval converging at an encountered vertex. The creation, splitting, concatenating, and destroying operations may be performed in different orders as the sweep line progresses across the navigation mesh and contiguous intervals of polygons are encountered and end. While two separate status data structures are referenced above, there may be many more in further embodiments where navigational meshes may overlap multiple times.

A status data structure includes segment identifiers corresponding to an interval of segments in a contiguous interval of polygons intersected by the sweep line at a stationary position of the sweep line. The segment identifiers, represented as letters in previous figures, may include endpoints of a segment in a selected coordinate system, such as a Cartesian coordinate system. Vertexes may also be represented by coordinate in the selected coordinate system. Note that the level various contiguous intervals of polygons are need not be tracked by the segment identifiers, as the method of identifying the contiguous intervals is sufficient for keeping separate status data structures for such contiguous intervals.

Two status data structures corresponding to different contiguous intervals of polygons contain mutually exclusive segment identifiers. In various embodiments, geometric operations on objects proximate different contiguous intervals of polygons are prevented from interfering with each other based on the separate status for each contiguous interval of polygons. The isolated first and second statuses may be processed simultaneously without interfering with each other.

Figure 4:
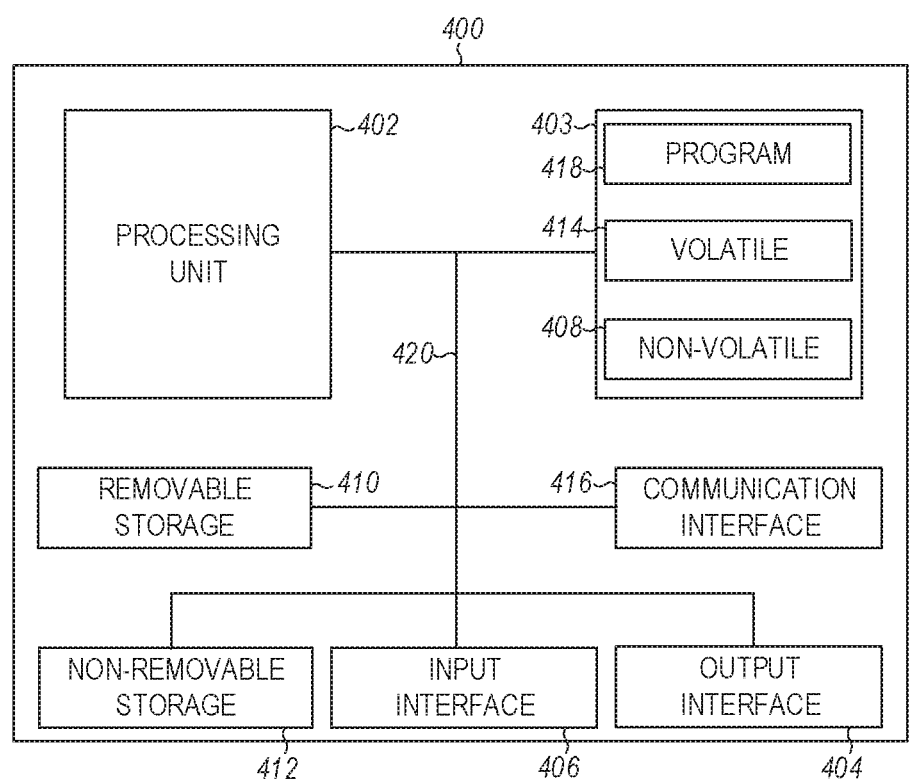
FIG. 4 is a block schematic diagram of a computer system to implement one or more example embodiments.

FIG. 4 is a block schematic diagram of a computer system 400 to implement an enhanced sweep algorithm utilizing multiple statuses while moving a sweep line across a multilevel mesh, and for performing methods and algorithms according to example embodiments. All components need not be used in various embodiments.

One example computing device in the form of a computer 400 may include a processing unit 402, memory 403, removable storage 410, and non-removable storage 412, Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412, Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Memory 403 may also include one or more queues, such as an event queue for the sweep line algorithm.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement an enhanced sweep algorithm utilizing multiple statuses for a multilevel mesh. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A computer implemented method including obtaining a navigation mesh representing a multi-level structure, the navigation mesh having multiple polygons defined by vertices and segments extending between vertices, and wherein some of the polygons overlap, creating a first status data structure in response to a sweep line encountering a first vertex corresponding to a first contiguous interval of polygons, wherein the first status data structure includes at least two segments having the vertex in common, creating a second status data structure in response to the sweep line encountering a second vertex having two different segments in common corresponding to a second contiguous interval of polygons, and continuing to sweep the mesh with the sweep line while keeping the first and second status data structures isolated for each contiguous interval of polygons.

2. The method of example 1 and further comprising splitting one of the first or second status data structures in response to a contiguous interval of polygons diverging at an encountered vertex.

3. The method of any of examples 1-2 and further comprising concatenating two status data structures in response to their respective contiguous intervals of polygons intersecting at a vertex.

4. The method of any of examples 1-3 and further comprising destroying a status data structure of an interval of polygons in response to all segments in the interval converging at an encountered vertex.

5. The method of any of examples 1-4 wherein a status data structure includes segment identifiers corresponding to an interval of segments in a contiguous interval of polygons intersected by the sweep line at a stationary position of the sweep line.

6. The method of example 5 wherein two status data structures corresponding to different contiguous intervals of polygons contain mutually exclusive segment identifiers.

7. The method of any of examples 1-6 and further comprising preventing geometric operations on objects proximate to different contiguous intervals of polygons from interfering with each other based on the separate status for each contiguous interval of polygons.

8. The method of any of examples 1-7 wherein the isolated first and second statuses are processed simultaneously without interfering with each other.

9. The method of any of examples 1-8 and further including queuing events in a single event queue in response to the sweep line encountering each vertex and applying events independently to different statuses.

10. A machine-readable storage device has instructions for execution by a processor of a machine to cause the processor to perform operations to perform a method of managing communication accounts. The operations include obtaining a navigation mesh representing a multi-level structure, the navigation mesh having multiple polygons defined by vertices and segments extending between vertices, and wherein some of the polygons overlap, creating a first status data structure in response to a sweep line encountering a first vertex corresponding to a first contiguous interval of polygons, wherein the first status data structure includes at least two segments having the vertex in common, creating a second status data structure in response to the sweep line encountering a second vertex having two different segments in common corresponding to a second contiguous interval of polygons, and continuing to sweep the mesh with the sweep line while keeping the first and second status data structures isolated for each contiguous interval of polygons.

11. The device of example 10 wherein the operations further include splitting one of the first or second status data structures in response to a contiguous interval of polygons diverging at an encountered vertex, concatenating two status data structures in response to their respective contiguous intervals of polygons intersecting at a vertex, and destroying a status data structure of an interval of polygons in response to all segments in the interval converging at an encountered vertex.

12. The device of any of examples 10-11 wherein a status data structure includes segment identifiers corresponding to an interval of segments in a contiguous interval of polygons intersected by the sweep line at a stationary position of the sweep line.

13. The device of example 12 wherein two status data structures corresponding to different contiguous intervals of polygons contain mutually exclusive segment identifiers.

14. The device of any of examples 10-13 wherein the operations further comprise preventing geometric operations on objects proximate to different contiguous intervals of polygons from interfering with each other based on the separate status for each contiguous interval of polygons.

15. The device of any of examples 10-14 wherein the isolated first and second statuses are processed simultaneously without interfering with each other.

16. The device of any of examples 10-15 wherein the operations further include queuing events in a single event queue in response to the sweep line encountering each vertex and applying events independently to different statuses.

17. A device includes a processor and a memory device coupled to the processor and having a program stored thereon for execution by the processor to perform operations. The operations include obtaining a navigation mesh representing a multi-level structure, the navigation mesh having multiple polygons defined by vertices and segments extending between vertices, and wherein some of the polygons overlap, creating a first status data structure in response to a sweep line encountering a first vertex corresponding to a first contiguous interval of polygons, wherein the first status data structure includes at least two segments having the vertex in common, creating a second status data structure in response to the sweep line encountering a second vertex having two different segments in common corresponding to a second contiguous interval of polygons, and continuing to sweep the mesh with the sweep line while keeping the first and second status data structures isolated for each contiguous interval of polygons.

18. The device of example 17 wherein the operations further include splitting one of the first or second status data structures in response to a contiguous interval of polygons diverging at an encountered vertex, concatenating two status data structures in response to their respective contiguous intervals of polygons intersecting at a vertex, and destroying a status data structure of an interval of polygons in response to all segments in the interval converging at an encountered vertex.

19. The device of any of examples 17-18 wherein a status data structure includes segment identifiers corresponding to an interval of segments in a contiguous interval of polygons intersected by the sweep line at a stationary position of the sweep line and wherein two status data structures corresponding to different contiguous intervals of polygons contain mutually exclusive segment identifiers.

20. The device of any of examples 17-19 wherein the operations further include queuing events in a single event queue in response to the sweep line encountering each vertex and applying events independently to different statuses.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining a navigation mesh representing a multi-level structure, the navigation mesh having multiple contiguous polygons defined by vertices and segments extending between vertices, and wherein some of the polygons overlap;
creating a first status data structure in response to a sweep line encountering a first vertex corresponding to a first contiguous interval of the polygons, wherein the first status data structure includes at least two segments having the first vertex in common;
creating a second status data structure in response to the sweep line encountering a second vertex having two different segments in common corresponding to a second contiguous interval of the polygons;
continuing to sweep the navigation mesh with the sweep line while keeping the first and second status data structures isolated for each contiguous interval of the polygons, while including segments of overlapping polygons in respective first and second status data structures; and splitting one of the first or second status data structures in response to a contiguous interval of the polygons diverging at an encountered vertex;

concatenating two status data structures in response to their respective contiguous intervals of the polygons intersecting at a vertex; and destroying a status data structure of an interval of the polygons in response to all segments in the interval converging at an encountered vertex.

2. The method of claim 1 wherein a status data structure is updated with newly encountered segment identifiers corresponding to an interval of segments in a contiguous interval of the polygons intersected by the sweep line at a stationary position of the sweep line.

3. The method of claim 2 wherein two status data structures corresponding to different contiguous intervals of the polygons contain mutually exclusive segment identifiers.

4. The method of claim 1 and further comprising preventing geometric operations on objects proximate to different contiguous intervals of the polygons from interfering with each other based on the first and second data status structures.

5. The method of claim 1 wherein the isolated first and second statuses are processed simultaneously without interfering with each other.

6. The method of claim 1 and further comprising:
queuing events in a single event queue in response to the sweep line encountering each vertex; and
applying events independently to different statuses.

7. A machine-readable storage device having instructions for execution by a processor of a machine to cause the processor to perform operations to perform a method of managing communication accounts, the operations comprising:

obtaining a navigation mesh representing a multi-level structure, the navigation mesh having multiple contiguous polygons defined by vertices and segments extending between vertices, and wherein some of the polygons overlap;

creating a first status data structure in response to a sweep line encountering a first vertex corresponding to a first contiguous interval of the polygons, wherein the first status data structure includes at least two segments having the first vertex in common;

creating a second status data structure in response to the sweep line encountering a second vertex having two different segments in common corresponding to a second contiguous interval of the polygons;

continuing to sweep the navigation mesh with the sweep line while keeping the first and second status data structures isolated for each contiguous interval of the polygons, while including segments of overlapping polygons in respective first and second status data structures; and splitting one of the first or second status data structures in response to a contiguous interval of the polygons diverging at an encountered vertex;

concatenating two status data structures in response to their respective contiguous intervals of the polygons intersecting at a vertex; and destroying a status data structure of an interval of the polygons in response to all segments in the interval converging at an encountered vertex.

8. The device of claim 7 wherein a status data structure includes segment identifiers corresponding to an interval of segments in a contiguous interval of the polygons intersected by the sweep line at a stationary position of the sweep line.

9. The device of claim 8 wherein two status data structures corresponding to different contiguous intervals of the polygons contain mutually exclusive segment identifiers.

10. The device of claim 7 wherein the operations further comprise preventing geometric operations on objects proximate to different contiguous intervals of the polygons from interfering with each other based on the first and second data status structures.

11. The device of claim 7 wherein the isolated first and second statuses are processed simultaneously without interfering with each other.

12. The device of claim 7 wherein the operations further comprise:
queuing events in a single event queue in response to the sweep line encountering each vertex; and
applying events independently to different statuses.

13. A device comprising:
a processor; and
a memory device coupled to the processor and having a program stored thereon for execution by the processor to perform operations comprising:

obtaining a navigation mesh representing a multi-level structure, the navigation mesh having multiple contiguous polygons defined by vertices and segments extending between vertices, and wherein some of the polygons overlap;

creating a first status data structure in response to a sweep line encountering a first vertex corresponding to a first contiguous interval of the polygons, wherein the first status data structure includes at least two segments having the first vertex in common;

creating a second status data structure in response to the sweep line encountering a second vertex having two different segments in common corresponding to a second contiguous interval of the polygons;

continuing to sweep the navigation mesh with the sweep line while keeping the first and second status data structures isolated for each contiguous interval of the polygons, while including segments of overlapping polygons in respective first and second status data structures; and splitting one of the first or second status data structures in response to a contiguous interval of the polygons diverging at an encountered vertex;

concatenating two status data structures in response to their respective contiguous intervals of the polygons intersecting at a vertex; and destroying a status data structure of an interval of the polygons in response to all segments in the interval converging at an encountered vertex.

14. The device of claim 13 wherein a status data structure includes segment identifiers corresponding to an interval of segments in a contiguous interval of the polygons intersected by the sweep line at a stationary position of the sweep line and wherein two status data structures corresponding to different contiguous intervals of the polygons contain mutually exclusive segment identifiers.

15. The device of claim 13 wherein the operations further comprise:
queuing events in a single event queue in response to the sweep line encountering each vertex; and
applying events independently to different statuses.

* * * * *